United States Patent
Lv et al.

(10) Patent No.: US 11,239,870 B2
(45) Date of Patent: Feb. 1, 2022

(54) TRANSMITTER DEVICE AND SIGNAL PROCESSING METHOD

(71) Applicant: Huawei Technologies Co., Ltd., Shenzhen (CN)

(72) Inventors: Yibo Lv, Shenzhen (CN); Xu Li, Shenzhen (CN); Guangjian Wang, Chengdu (CN); Jingjing Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/321,287

(22) Filed: May 14, 2021

(65) Prior Publication Data
US 2021/0273667 A1    Sep. 2, 2021

Related U.S. Application Data

(63) Continuation of application No. PCT/CN2019/113647, filed on Oct. 28, 2019.

(30) Foreign Application Priority Data

Nov. 16, 2018    (CN) .......................... 201811366074.1

(51) Int. Cl.
*H04B 1/04*    (2006.01)
*H04B 7/06*    (2006.01)
*H04B 7/0413*    (2017.01)

(52) U.S. Cl.
CPC ......... *H04B 1/0475* (2013.01); *H04B 7/0617* (2013.01); *H04B 7/0413* (2013.01);
(Continued)

(58) Field of Classification Search
CPC .. H04B 1/0475; H04B 7/0617; H04B 7/0413; H04B 2001/0425; H04B 2001/0433; H04L 25/49
See application file for complete search history.

(56) References Cited

U.S. PATENT DOCUMENTS 8,526,537 B2    9/2013    Chen et al.
9,172,409 B2    10/2015    Copeland
(Continued)

FOREIGN PATENT DOCUMENTS

CN    101594327 A    12/2009
CN    101626356 A    1/2010
(Continued)

OTHER PUBLICATIONS

Abdelaziz, M. et al., "Digital Predistortion for Hybrid MIMO Transmitters", IEEE Journal of Selected Topics in Signal Processing, Jun. 2018, 10 pages.
(Continued)

*Primary Examiner* — Vineeta S Panwalkar
(74) *Attorney, Agent, or Firm* — Slater Matsil, LLP

(57) ABSTRACT

This application relates to the field of communications technologies and discloses a transmitter device and a signal processing method. m transmit antenna groups of the transmitter are configured to send m training signals under control of the processor. A target feedback antenna of the transmitter is configured to receive, under control of the processor, a first mixed signal obtained by superimposing the m training signals in space, where a phase difference between the first mixed signal and a second mixed signal obtained by superimposing in space the m training signals received by a receiver device falls within a preset range. A processor of the transmitter is configured to: perform DPD parameter estimation and pre-distortion processing on a to-be-sent signal. The m transmit antenna groups are further configured to send, under control of the processor, the to-be-sent signal on which pre-distortion processing has been performed.

20 Claims, 11 Drawing Sheets

(52) U.S. Cl.
CPC ............. *H04B 2001/0425* (2013.01); *H04B 2001/0433* (2013.01)

(56) References Cited

U.S. PATENT DOCUMENTS

| | | | |
|---|---|---|---|
| 9,888,416 B2 | 2/2018 | Duan et al. | |
| 10,887,079 B1* | 1/2021 | Geron | H04B 10/25753 |
| 2012/0321018 A1* | 12/2012 | Chen | H03F 1/3241 |
| | | | 375/296 |
| 2014/0133543 A1 | 5/2014 | Da Silveira et al. | |
| 2015/0063288 A1 | 3/2015 | Yang et al. | |
| 2015/0103952 A1* | 4/2015 | Wang | H03F 3/24 |
| | | | 375/297 |
| 2016/0156487 A1 | 6/2016 | Loghin et al. | |
| 2017/0134210 A1 | 5/2017 | Eitan et al. | |

FOREIGN PATENT DOCUMENTS

| | | |
|---|---|---|
| CN | 102014401 A | 4/2011 |
| CN | 102082752 A | 6/2011 |
| CN | 102088427 A | 6/2011 |
| CN | 102158265 A | 8/2011 |
| CN | 102882478 A | 1/2013 |
| CN | 103957178 A | 7/2014 |
| CN | 104301268 A | 1/2015 |
| CN | 104901638 A | 9/2015 |
| CN | 105765861 A | 7/2016 |
| CN | 106102156 A | 11/2016 |
| CN | 107566306 A | 1/2018 |

OTHER PUBLICATIONS

Lee, S. et al., "Digital Predistortion for Power Amplifiers in Hybrid MIMO Systems with Antenna Subarrays", IEEE 81st Vehicular Technology Conference (VTC Spring), 2015, 5 pages.

Chen, W. et al., "Energy-Efficient Doherty Power Amplifier MMIC and Beamforming-Oriented Digital Predistortion for 5G Massive MIMO Application", IEEE Asia Pacific Microwave Conference (APMC), 2017, 4 pages.

Liu, L. et al., "Single-PA-Feedback Digital Predistortionfor Beamforming MIMO Transmitter", IEEE International Conference on Microwave and Millimeter Wave Technology (ICMMT), 2016, 3 pages.

Zhang, Z. et al., "An improved Cross Talk Cancelling Digital Predistortion for MIMO Transmitters", Hindawi Publishing Corporation, Mobile Information Systems, 2016, 8 pages.

Choi, S. et al., "Digital Predistortion Based on Combined Feedback in MIMO Transmitters", IEEE Communications Letters vol. 16, No. 10, Oct. 2012, 4 pages.

* cited by examiner

TRANSMITTER DEVICE AND SIGNAL PROCESSING METHOD

CROSS-REFERENCE TO RELATED APPLICATIONS

This application is a continuation of International Patent Application No. PCT/CN2019/113647, filed on Oct. 28, 2019, which claims priority to Chinese Patent Application No. 201811366074.1, filed on Nov. 16, 2018. The disclosures of the aforementioned applications are hereby incorporated by reference in their entireties.

TECHNICAL FIELD

This application relates to the field of communications technologies, and in particular, to a transmitter device and a signal processing method.

BACKGROUND

Compared with a conventional multi-input and multi-output (MIMO) technology, a large-scale MIMO technology uses dozens or even hundreds of transmit antennas. After combined with a beamforming technology, the large-scale MIMO technology can effectively improve spectral efficiency, power efficiency, coverage, and communication reliability of a wireless communications system.

In a large-scale MIMO system, an independent power amplifier (PA) link is usually configured for each transmit antenna. This means that a quantity of power amplifiers of a transmitter device in the large-scale MIMO system also reaches dozens or even hundreds. In this case, to reduce system energy consumption, efficiency of the power amplifier needs to be improved, which reduces a linearity of the power amplifier. Serious in-band distortion and out-of-band distortion occur when a signal passes through a low-linearity power amplifier.

To resolve the contradiction between the efficiency and the linearity of the power amplifier, an additional linearization technology may be used based on nonlinear characteristics of the power amplifier. A digital pre-distortion (DPD) technology has become one of commonly used linearization technologies in a communications system because of its simple structure, wide application scope, and stable performance. Therefore, an effective digital pre-distortion architecture needs to be designed.

SUMMARY

This application provides a transmitter device and a signal processing method, and is specifically used to provide an effective pre-distortion architecture and a signal processing method based on the digital pre-distortion architecture, so that implementation is simple and overall system performance can be improved. A module/component included in the pre-distortion architecture may be considered as a module/component included in the transmitter device below.

According to a first aspect, an embodiment of this application provides a transmitter device, including m transmit antenna groups, a target feedback antenna, and a processor. Each of the m transmit antenna groups includes at least one transmit antenna, and m is an integer greater than or equal to 1. The m transmit antenna groups and the target feedback antenna are separately connected to the processor. The m transmit antenna groups are configured to send m training signals under control of the processor, where one transmit antenna group is configured to send one training signal. The target feedback antenna is configured to receive, under control of the processor, a first mixed signal obtained by superimposing the m training signals in space. A phase difference between the first mixed signal and a second mixed signal falls within a preset range, and the second mixed signal is a signal obtained by superimposing in space the m training signals received by a receiver device. The processor is configured to: perform DPD parameter estimation based on the first mixed signal to obtain a DPD parameter, and perform pre-distortion processing on a to-be-sent signal based on the DPD parameter. The m transmit antenna groups are further configured to send, under control of the processor, the to-be-sent signal on which pre-distortion processing has been performed.

The transmitter device may be a network device or a terminal. A training signal is a concept proposed in this embodiment of this application to distinguish a signal that needs to be sent in a process of obtaining the DPD parameter by the transmitter device from a signal (namely, the to-be-sent signal) in a process of performing pre-distortion processing.

In this technical solution, the target feedback antenna is locally configured to simulate a phase of a signal received by the receiver device, to determine the DPD parameter based on the simulated phase. In this way, the transmitter device does not need to have a complex structure and can obtain the phase of the signal received by the receiver device. Therefore, implementation is simple. In addition, the target feedback antenna is locally configured to avoid interference caused by a near-field effect of a transmit antenna array, so that overall system performance can be improved.

In a possible design, the transmitter device further includes m phase shifters. The processor is connected to the m phase shifters, and one phase shifter is connected to one transmit antenna group. In this case, the processor is further configured to set a phase of a $k^{th}$ phase shifter of the m phase shifters to a target phase $\xi_k$, where $1 \leq k \leq m$, k is an integer, and a $k^{th}$ transmit antenna group of the m transmit antenna groups is connected to the $k^{th}$ phase shifter. The $k^{th}$ phase shifter is configured to adjust a phase of a received signal to the target phase $\xi_k$ and use a signal obtained after the phase adjustment as a $k^{th}$ training signal of the m training signals, so that the phase difference between the first mixed signal and the second mixed signal falls within the preset range. Based on this possible design, the processor may traverse k=i~m, to obtain the m training signals. Optionally, the m phase shifters may be m phase shifters configured to send the to-be-sent signal. Optionally, a position of the target feedback antenna may be fixed. In this possible design, the phase of the phase shifter for sending the to-be-sent signal is adjusted, so that the phase difference between the first mixed signal and the second mixed signal falls within the preset range.

In a possible design, the processor is further configured to obtain the target phase $\xi_k$ based on $\phi_k$ and $\gamma_k$, where $\phi_k$ is a phase when the $k^{th}$ training signal arrives at the receiver device through space transmission, and $\gamma_k$ is a phase difference between a phase of the $k^{th}$ training signal and a phase when the $k^{th}$ training signal arrives at the target feedback antenna through space transmission. For example, the target phase $\xi_k$ is obtained according to a formula $\xi_k = \phi_k - \gamma_k$. The processor may obtain a target phase of each phase shifter based on this optional implementation.

In a possible design, the processor is further configured to adjust the position of the target feedback antenna, so that the phase difference between the first mixed signal and the second mixed signal falls within the preset range. In this possible design, the position of the target feedback antenna is adjusted, so that the phase difference between the first mixed signal and the second mixed signal falls within the preset range.

In a possible design, the processor is specifically configured to adjust the position of the target feedback antenna to a position whose coordinates are (x, y, z), where $x=r \cos \beta_0 \cos \alpha_0$, $y=r \cos \beta_0 \sin \alpha_0$, and $z=r \sin \beta_0$. (x, y, z) are coordinates in a coordinate system formed by an X-axis, a Y-axis, and a Z-axis, the X-axis, the Y-axis, and the Z-axis are mutually perpendicular to each other, and an origin of the coordinate system is a target transmit antenna group in the m transmit antenna groups. The target transmit antenna group is any one of the m transmit antenna groups, and a plane X-Y formed by the X-axis and the Y-axis is a plane on which the m transmit antenna groups are located. r is a distance between the target feedback antenna and the origin; $\beta_0$ is an included angle between a target connection line and the plane X-Y, where the target connection line is a connection line between the target feedback antenna and the origin; and $\alpha_0$ is an included angle between a projection of the target connection line on the plane X-Y and the X-axis.

In a possible design, the target feedback antenna is one feedback antenna of at least two candidate feedback antennas included in the transmitter device, and different feedback antennas of the at least two candidate feedback antennas have different positions. Each candidate feedback antenna in a candidate antenna group is connected to the processor by using a switch. In this case, the processor is further configured to select the target feedback antenna from the at least two candidate feedback antennas and control the switch, to connect the processor to the target feedback antenna, so that the phase difference between the first mixed signal and the second mixed signal falls within the preset range. In this possible design, a plurality of candidate feedback antennas at different positions are configured, and in actual application, one of the candidate feedback antennas is selected as the target feedback antenna, so that the phase difference between the first mixed signal and the second mixed signal falls within the preset range.

In a possible design, the processor is specifically configured to use a candidate feedback antenna that is in a candidate feedback antenna group and that is closest to coordinates (x, y, L) as the target feedback antenna, where $$x = \frac{L}{\tan \beta_0} \cos \alpha_0 \text{ and } y = \frac{L}{\tan \beta_0} \sin \alpha_0.$$

The coordinates (x, y, L) are coordinates in a coordinate system formed by an X-axis, a Y-axis, and a Z-axis, the X-axis, the Y-axis, and the Z-axis are mutually perpendicular to each other, and an origin of the coordinate system is a target transmit antenna group in the m transmit antenna groups. The target transmit antenna group is any one of the m transmit antenna groups, a plane X-Y formed by the X-axis and the Y-axis is a plane on which the m transmit antenna groups are located, and a plane on which the candidate feedback antenna group is located is parallel to the plane on which the m transmit antenna groups are located. L is a distance between the plane on which the candidate feedback antenna group is located and the plane on which the m transmit antenna groups are located; $\beta_0$ is an included angle between a target connection line and the plane X-Y, where the target connection line is a connection line between the target feedback antenna and the origin; and $\alpha_0$ is an included angle between a projection of the target connection line on the plane X-Y and the X-axis.

According to a second aspect, an embodiment of this application provides a signal processing method, applied to a transmitter device. The method includes: sending m training signals, where m is an integer greater than or equal to 1; receiving a first mixed signal obtained by superimposing the m training signals in space, where a phase difference between the first mixed signal and a second mixed signal falls within a preset range, and the second mixed signal is a signal obtained by superimposing in space the m training signals received by a receiver device; performing digital pre-distortion DPD parameter estimation based on the first mixed signal to obtain a DPD parameter, and performing pre-distortion processing on a to-be-sent signal based on the DPD parameter; and sending the to-be-sent signal on which pre-distortion processing has been performed.

In a possible design, the method further includes: adjusting a phase of a $k^{th}$ training signal of the m training signals to a target phase $\xi_k$, so that the phase difference between the first mixed signal and the second mixed signal falls within the preset range, where $1 \leq k \leq m$, and k is an integer.

In a possible design, the method further includes: obtaining the target phase $\xi_k$ based on $\phi_k$ and $\gamma_k$, where $\phi_k$ is a phase when the $k^{th}$ training signal arrives at the receiver device through space transmission, and $\gamma^k$ is a difference between a phase of the $k^{th}$ training signal and a phase when the $k^{th}$ training signal arrives, through space transmission, at the target feedback antenna that is in the transmitter device and that is configured to receive the first mixed signal.

In a possible design, the obtaining the target phase $\xi_k$ based on $\phi_k$ and $\gamma^k$ includes: obtaining the target phase $\xi_k$ according to a formula $\xi_k = \phi_k - \gamma_k$.

In a possible design, the method further includes: adjusting a position of the target feedback antenna that is in the transmitter device and that is configured to receive the first mixed signal, so that the phase difference between the first mixed signal and the second mixed signal falls within the preset range.

In a possible design, the adjusting a position of the target feedback antenna that is in the transmitter device and that is configured to receive the first mixed signal includes: adjusting the position of the target feedback antenna to a position whose coordinates are (x, y, z), where $x=r \cos \beta_0 \cos \alpha_0$, $y=r \cos \beta_0 \sin \alpha_0$, and $z=r \sin \beta_0$. For explanations of related parameters in the formulas, refer to the foregoing descriptions.

In a possible design, the method further includes: selecting, from at least two candidate feedback antennas, the target feedback antenna that is in the transmitter device and that is configured to receive the first mixed signal, so that the phase difference between the first mixed signal and the second mixed signal falls within the preset range. Different feedback antennas in the at least two candidate feedback antennas have different positions.

In a possible design, the selecting, from at least two candidate feedback antennas, the target feedback antenna that is in the transmitter device and that is configured to receive the first mixed signal includes: using a candidate feedback antenna that is in a candidate feedback antenna group and that is closest to coordinates (x, y, L) as the target feedback antenna, where $$x = \frac{L}{\tan \beta_0} \cos \alpha_0 \text{ and } y = \frac{L}{\tan \beta_0} \sin \alpha_0.$$

For explanations of related parameters in the formulas, refer to the foregoing descriptions.

According to a third aspect, an embodiment of this application provides a signal processing apparatus, configured to perform the method provided in the second aspect or any possible design of the second aspect. The apparatus may be a transmitter device (for example, a terminal or a network device).

In a possible design, the signal processing apparatus may be divided into functional modules based on the method provided in the second aspect or any possible design of the second aspect. For example, each functional module may be obtained through division corresponding to each function, or two or more functions may be integrated into one processing module.

For example, the transmitter device may include a sending unit, a receiving unit, and a processing unit. The sending unit is configured to send m training signals, where m is an integer greater than or equal to 1. The receiving unit is configured to receive a first mixed signal obtained by superimposing the m training signals in space. A phase difference between the first mixed signal and a second mixed signal falls within a preset range, and the second mixed signal is a signal obtained by superimposing in space the m training signals received by a receiver device. The processing unit is configured to: perform digital pre-distortion DPD parameter estimation based on the first mixed signal to obtain a DPD parameter, and perform pre-distortion processing on a to-be-sent signal based on the DPD parameter. The sending unit is further configured to send the to-be-sent signal on which pre-distortion processing has been performed.

In a possible design, the processing unit is further configured to adjust a phase of a $k^{th}$ training signal of the m training signals to a target phase $\xi_k$, so that the phase difference between the first mixed signal and the second mixed signal falls within the preset range, where $1 \le k \le m$, and k is an integer.

In a possible design, the processing unit is further configured to obtain the target phase $\xi_k$ based on $\phi_k$ and $\gamma_k$, where $\phi_k$ is a phase when the $k^{th}$ training signal arrives at the receiver device through space transmission, and $\gamma_k$ is a difference between a phase of the $k^{th}$ training signal and a phase when the $k^{th}$ training signal arrives, through space transmission, at the target feedback antenna that is in the transmitter device and that is configured to receive the first mixed signal.

In a possible design, the processing unit is specifically configured to obtain the target phase $\xi_k$ according to a formula $\xi_k = \phi_k - \gamma_k$.

In a possible design, the processing unit is further configured to adjust a position of the target feedback antenna that is in the transmitter device and that is configured to receive the first mixed signal, so that the phase difference between the first mixed signal and the second mixed signal falls within the preset range.

In a possible design, the processing unit is specifically configured to adjust the position of the target feedback antenna to a position whose coordinates are (x, y, z), where $x = r \cos \beta_0 \cos \alpha_0$, $y = r \cos \beta_0 \sin \alpha_0$, and $z = r \sin \beta_0$. For explanations of related parameters in the formulas, refer to the foregoing descriptions.

In a possible design, the processing unit is further configured to select, from at least two candidate feedback antennas, the target feedback antenna that is in the transmitter device and that is configured to receive the first mixed signal, so that the phase difference between the first mixed signal and the second mixed signal falls within the preset range. Different feedback antennas in the at least two candidate feedback antennas have different positions.

In a possible design, the processing unit is specifically configured to use a candidate feedback antenna that is in a candidate feedback antenna group and that is closest to coordinates (x, y, L) as the target feedback antenna, where $$x = \frac{L}{\tan \beta_0} \cos \alpha_0 \text{ and } y = \frac{L}{\tan \beta_0} \sin \alpha_0.$$

For explanations of related parameters in the formulas, refer to the foregoing descriptions.

According to a fourth aspect, an embodiment of this application provides a signal processing apparatus, including a memory and a processor, where the memory is configured to store a computer program, and the processor is configured to invoke the computer program, to perform the method provided in the second aspect or any possible design of the second aspect. For example, the apparatus may be a transmitter device (for example, a network device or a terminal) or a chip.

An embodiment of this application further provides a computer-readable storage medium. The computer-readable storage medium stores a computer program. When the computer program is run on a computer, the computer is enabled to perform the method provided in the second aspect or any possible design of the second aspect. For example, the computer may be a transmitter device.

An embodiment of this application further provides a computer program product. When the computer program product runs on a computer, the method provided in the second aspect or any possible design of the second aspect is performed.

It may be understood that, for beneficial effects that can be achieved by any one of the signal processing apparatus, the transmitter device, the computer-readable storage medium, the computer program product, or the like provided above, refer to the beneficial effects in the first aspect or the possible implementations of the first aspect. Details are not described herein again.

It should be noted that, the foregoing components provided in the embodiments of this application that are configured to store computer instructions or a computer program include but are not limited to, for example, the foregoing memory and the computer-readable storage medium, and are all non-volatile.

DETAILED DESCRIPTION OF ILLUSTRATIVE EMBODIMENTS

The term "at least one (type)" in embodiments of this application includes one (type) or more (types). "A plurality of (types)" refers to two (types) or more (types). For example, at least one of A, B, and C includes: Only A exists, only B exists, both A and B exist, both A and C exist, both B and C exist, and A, B and C all exist. In this application, unless otherwise specified, "/" means or. For example, A/B may represent A or B. "And/or" in this specification is merely an association relationship for describing associated objects, and represents that three relationships may exist. For example, A and/or B may represent the following three cases: Only A exists, both A and B exist, and only B exists. "A plurality of" means two or more. For ease of clearly describing the technical solutions in the embodiments of this application, words such as "first" and "second" are used in the embodiments of this application to distinguish same items or similar items that have basically the same function and effect. A person skilled in the art may understand that the words "first" and "second" do not limit a quantity and an execution order, and the words "first" and "second" do not necessarily limit a difference.

The technical solutions provided in the embodiments of this application are applicable to various communications systems, for example, a 5th generation (5G) mobile communications system such as a 5G new radio (NR) system, a future evolved system, or a plurality of communications convergence systems, or applicable to an existing communications system. The technical solutions provided in this application may include a plurality of application scenarios, for example, machine to machine (M2M), macro-micro communication, enhanced mobile broadband (eMBB), ultra-reliable low-latency communication (uRLLC), and massive machine type communication (mMTC) scenarios. These scenarios may include, but are not limited to, a scenario of communication between terminals, a scenario of communication between network devices, a scenario of communication between a network device and a terminal, and the like. In this specification, an example of application to a scenario of communication between a network device and a terminal is used for description.

Figure 1:
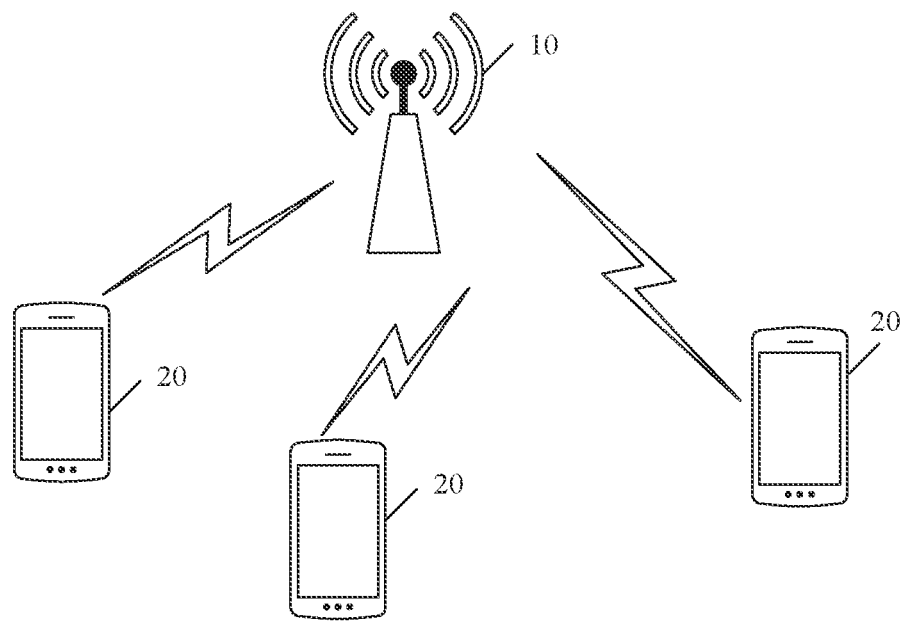
FIG. 1 is a schematic diagram of a communications system applicable to an embodiment of this application.

FIG. 1 is a schematic diagram of a communications system applicable to an embodiment of this application. The communications system may include one or more network devices 10 (only one is shown) and one or more terminals 20 connected to each network device 10. FIG. 1 is merely a schematic diagram, and does not constitute a limitation on application scenarios of the technical solutions provided in this application.

The network device 10 may be a transmission reception point (TRP), a base station, a relay station, an access point, or the like. The network device 10 may be a network device in a 5G communications system or a network device in a future evolved network, or may be a wearable device, a vehicle-mounted device, or the like. In addition, the network device 10 may alternatively be a base transceiver station (BTS) in a global system for mobile communications (GSM) or a code division multiple access (CDMA) network, or an NB (NodeB) in wideband code division multiple access (WCDMA), or an eNB or an eNodeB (evolved NodeB) in long term evolution (LTE). The network device 10 may alternatively be a radio controller in a cloud radio access network (CRAN) scenario.

The terminal 20 may be user equipment (UE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal in a 5G network, a terminal in a future evolved public land mobile network (PLMN), or the like.

Optionally, network elements (for example, the network device 10 and the terminal 20) in FIG. 1 may be implemented by one device, or may be implemented by a plurality of devices together, or may be one functional module in one device. This is not specifically limited in this embodiment of this application. It may be understood that the foregoing function may be a network element function in a hardware device, a software function running on dedicated hardware, or a virtualization function instantiated on a platform (for example, a cloud platform).

Figure 2:
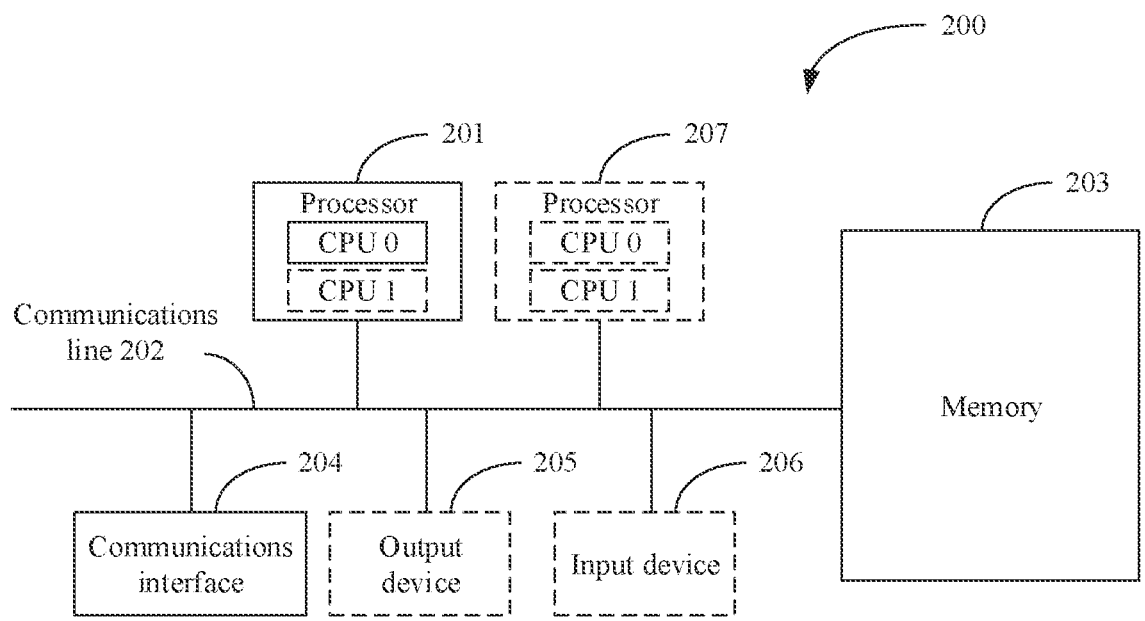
FIG. 2 is a schematic structural diagram of hardware of a communications device applicable to an embodiment of this application.

For example, the network elements in FIG. 1 may be implemented by using a communications device 200 in FIG. 2. FIG. 2 is a schematic structural diagram of hardware of a communications device applicable to an embodiment of this application. The communications device 200 includes at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits for controlling program execution in this application.

The communications line 202 may include a path for transmitting information between the components.

The communications interface 204 is any apparatus (such as an antenna) of a transceiver type, and is configured to communicate with another device or a communications network, such as an Ethernet, a RAN, or a wireless local area network (WLAN).

The memory 203 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another optical disk storage, an optical disc storage (including a compressed optical disc, a laser disc, an optical disc, a digital versatile optical disc, a Blu-ray disc, and the like), a magnetic disk storage medium or another magnetic storage device, or any other medium capable of carrying or storing desired program code in the form of instructions or data structures and capable of being accessed by a computer, but not limited thereto. The memory may exist independently, and is connected to the processor by using the communications line 202. The memory may alternatively be integrated with the processor. The memory provided in this embodiment of this application may be generally non-volatile. The memory 203 is configured to store computer executable instructions for performing the solutions of this application, and the processor 201 controls execution. The processor 201 is configured to execute the computer executable instructions stored in the memory 203, to implement the method provided in the following embodiments of this application.

Optionally, the computer executable instructions in this embodiment of this application may also be referred to as application program code. This is not specifically limited in this embodiment of this application.

In specific implementation, in an embodiment, the processor 201 may include one or more CPUs, for example, a CPU 0 and a CPU 1 in FIG. 2.

In specific implementation, in an embodiment, the communications device 200 may include a plurality of processors, for example, a processor 201 and a processor 207 in FIG. 2. Each of these processors may be a single-core (single-CPU) processor, or may be a multi-core (multi-CPU) processor. The processor herein may be one or more devices, circuits, and/or processing cores configured to process data (for example, computer program instructions).

In specific implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, or a cathode ray tube (CRT) display device, or a projector. The input device 206 communicates with the processor 201, and may receive user input in a plurality of manners. For example, the input device 206 may be a mouse, a keyboard, a touchscreen device, or a sensor device.

The communications device 200 may be a general-purpose device or a dedicated device. In specific implementation, the communications device 200 may be a desktop computer, a portable computer, a network server, a personal digital assistant (PDA), a mobile phone, a tablet computer, a wireless terminal device, an embedded device, or a device having a structure similar to that in FIG. 2. The type of the communications device 200 is not limited in this embodiment of this application.

It should be noted that any technical solution provided in this embodiment of this application may be applied to a downlink transmission scenario, or may be applied to an uplink transmission scenario. When applied to a downlink transmission scenario, a transmitter device may be a network device, and a receiver device may be a terminal. When applied to an uplink transmission scenario, a transmitter device may be a terminal, and a receiver device may be a network device. The descriptions are unified herein, and details are not described below.

The technical solutions provided in the embodiments of this application are described below with reference to the accompanying drawings.

Figure 3:
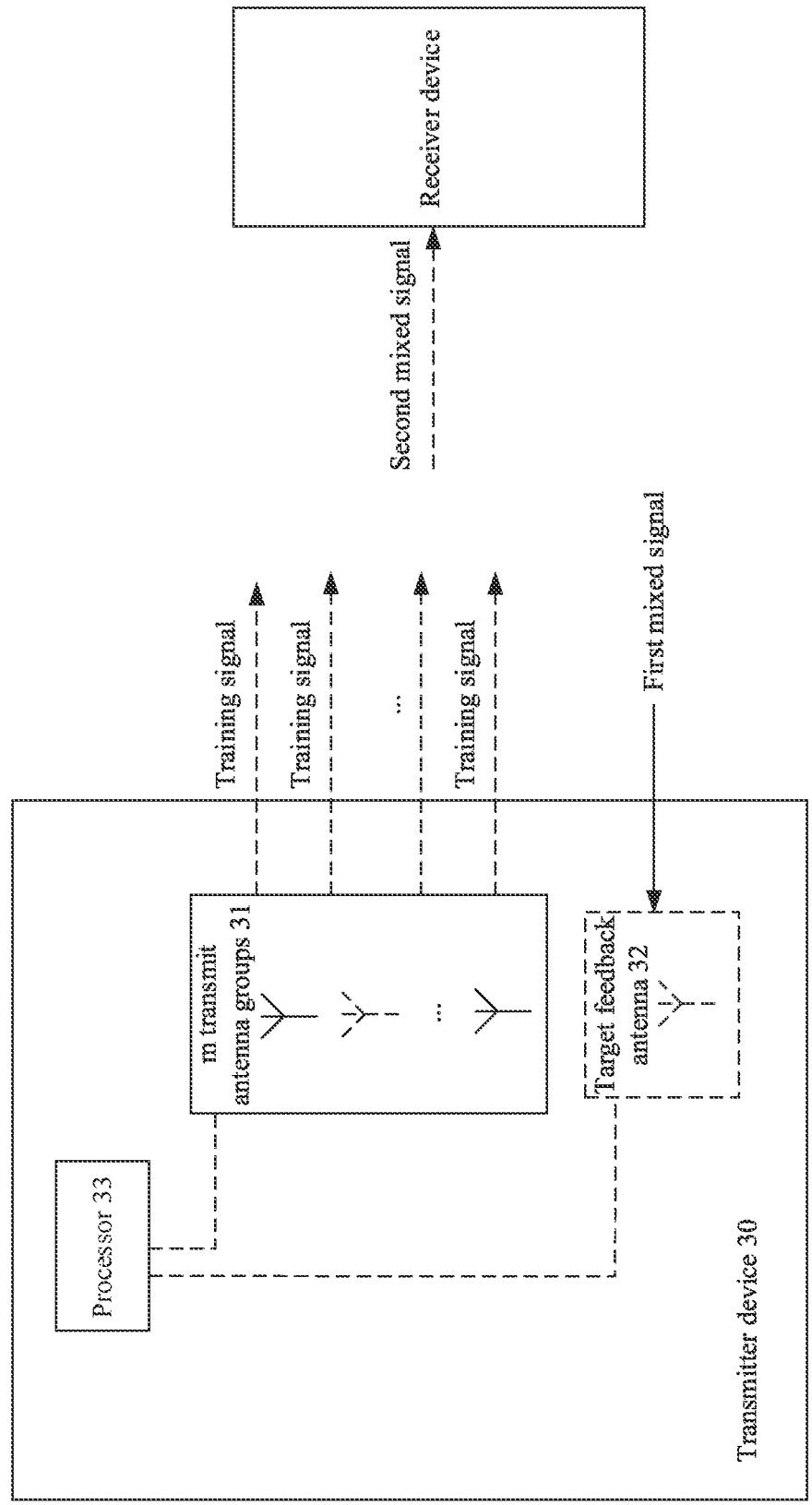
FIG. 3 is a schematic structural diagram of a transmitter device according to an embodiment of this application.

FIG. 3 is a schematic structural diagram of a transmitter device 30 according to an embodiment of this application. The transmitter device 30 includes m transmit antenna groups 31, a target feedback antenna 32, and a processor 33. Each transmit antenna group 31 includes at least one transmit antenna, and m is an integer greater than or equal to 1. The m transmit antenna groups 31 and the target feedback antenna 32 are separately connected to the processor 33.

The m transmit antenna groups 31 are configured to send m training signals under control of the processor 33, where one transmit antenna group is configured to send one training signal.

The target feedback antenna 32 is configured to receive, under control of the processor 33, a first mixed signal obtained by superimposing the m training signals in space. A phase difference between the first mixed signal and a second mixed signal falls within a preset range, and the second mixed signal is a signal obtained by superimposing in space the m training signals received by a receiver device.

The processor 33 is configured to: perform DPD parameter estimation based on the first mixed signal to obtain a DPD parameter, and perform pre-distortion processing, namely DPD, on a to-be-sent signal based on the DPD parameter.

The m transmit antenna groups 31 are further configured to send, under control of the processor 33, the to-be-sent signal on which pre-distortion processing has been performed.

It may be understood that a DPD technology may include the process of obtaining the DPD parameter and the process of performing pre-distortion processing.

The training signal is a concept proposed in this embodiment of this application to distinguish a signal that needs to be sent in the process of obtaining the DPD parameter by the transmitter device from the signal (that is, the to-be-sent signal) in the process of performing pre-distortion processing. The training signal may be specifically a reference signal, a data signal, or the like.

The to-be-sent signal is a signal that needs to be actually sent by the transmitter device to the receiver device and that is used to transmit information, and the to-be-sent signal may be a reference signal, a data signal, or the like.

The first mixed signal may be understood as a signal obtained when the m training signals arrive at the target feedback antenna 32.

The second mixed signal may be understood as a signal obtained when the m training signals arrive at the receiver device.

The phase difference (or an absolute value of the phase difference) between the first mixed signal and the second mixed signal may be used to represent a fitting degree (or a closeness degree) of the first mixed signal received by the transmitter device for the second mixed signal received by the receiver device. A smaller absolute value of the phase difference indicates a higher fitting degree. Optionally, the phase difference is 0.

A manner for determining the preset range and a specific value of the preset range are not limited in this embodiment of this application, for example, may be determined based on information such as accuracy of obtaining the DPD parameter and an actual architecture (for example, a position of a transmit antenna or a quantity and/or positions of feedback antennas) of the transmitter device.

In an example, with reference to the communications device 200 shown in FIG. 2, the transmit antenna group 31 may be considered as the communications interface 204, and the processor 33 may be considered as the processor 201. The target feedback antenna 32 may be considered as a communications interface that is added on the basis of the communications device 200 shown in FIG. 2 and that is configured to receive a signal, for example, a training signal, sent by the transmit antenna group 31.

In the transmitter device provided in this embodiment of this application, the target feedback antenna is locally configured to simulate a phase of a signal received by the receiver device, to determine the DPD parameter based on the simulated phase. In this way, the transmitter device does not need to have a complex structure and can simulate the phase of the signal received by the receiver device. Therefore, implementation is simple. In addition, the target feedback antenna is locally configured to avoid interference caused by a near-field effect of a transmit antenna array, so that overall system performance can be improved. For a specific analysis process, refer to the following descriptions.

How to implement that "the phase difference between the first mixed signal and the second mixed signal falls within the preset range" is not specifically limited in this embodiment of this application. The following lists several optional implementations:

Manner 1: The transmitter device 30 further includes m phase shifters. The processor 33 is connected to the m phase shifters, and one phase shifter is connected to one transmit antenna group 31. In this case, the processor 33 is further configured to set a phase of a $k^{th}$ phase shifter of the m phase shifters to a target phase $\xi_k$, where $1 \le k \le m$, k is an integer, and a $k^{th}$ transmit antenna group of the m transmit antenna groups is connected to the $k^{th}$ phase shifter. The $k^{th}$ phase shifter is configured to adjust a phase of a received signal to the target phase $\xi_k$ and use a signal obtained after the phase adjustment as a $k^{th}$ training signal of the m training signals, so that the phase difference between the first mixed signal and the second mixed signal falls within the preset range.

The m phase shifters may be phase shifters configured to send the to-be-sent signal.

During specific implementation, the processor 33 may traverse k=1~m, so that phases of the m phase shifters are all adjusted to corresponding target phases. Target phases of different phase shifters may be the same or may be different.

Optionally, the processor 33 is further configured to obtain the target phase $\xi_k$ based on $\phi_k$ and $\gamma_k$, where $\phi_k$ is a phase when the $k^{th}$ training signal arrives at the receiver device through space transmission, and $\gamma_k$ is a difference between a phase of the $k^{th}$ training signal and a phase when the $k^{th}$ training signal arrives at the target feedback antenna 32 through space transmission. For example, the target phase $\xi_k$ is obtained according to a formula $\xi_k = \phi_k - \gamma_k$. For descriptions of the parameters in the formula and descriptions of the principle, refer to the following Embodiment 1. Details are not described herein.

In Manner 1, each transmit antenna group is connected to one phase shifter, and the phase difference between the first mixed signal and the second mixed signal falls within the preset range by setting a target phase of the phase shifter. A position of the target feedback antenna 32 may be fixed. Certainly, this embodiment of this application is not limited thereto.

Manner 2: The processor 33 is further configured to adjust the position of the target feedback antenna 32, so that the phase difference between the first mixed signal and the second mixed signal falls within the preset range.

Optionally, the processor 33 is specifically configured to adjust the position of the target feedback antenna 32 to a position whose coordinates are (x, y, z), or to a position whose distance from the position whose coordinates are (x, y, z) is less than or equal to a threshold, where $x = r \cos \beta_0 \cos \alpha_0$, $y = r \cos \beta_0 \sin \alpha_0$, and $z = r \sin \beta_0$. For descriptions of parameters in the formulas and descriptions of the principles, refer to the following Embodiment 2. Details are not described herein.

Manner 3: The target feedback antenna 32 is one feedback antenna of at least two candidate feedback antennas included in the transmitter device, and different feedback antennas in the at least two candidate feedback antennas have different positions. Each candidate feedback antenna in a candidate antenna group is connected to the processor 33 by using a switch. In this case, the processor 33 is further configured to select the target feedback antenna 32 from the at least two candidate feedback antennas and control the switch, to connect the processor 33 to the target feedback antenna 32, so that the phase difference between the first mixed signal and the second mixed signal falls within the preset range.

Optionally, the processor 33 is specifically configured to use a candidate feedback antenna that is in a candidate feedback antenna group and that is closest to coordinates (x, y, L) as the target feedback antenna, where $$x = \frac{L}{\tan \beta_0} \cos \alpha_0 \text{ and } y = \frac{L}{\tan \beta_0} \sin \alpha_0.$$

For descriptions of parameters in the formulas and descriptions of principles, refer to the following Embodiment 2. Details are not described herein.

It may be understood that, in a specific implementation process, to use the DPD technology in a MIMO system, the transmitter device may further include other components than the components shown in FIG. 3.

The transmitter device provided in the embodiments of this application is described below by using several embodiments, and a data processing method provided in the embodiments of this application is described below based on the transmitter device provided in each embodiment.

Embodiment 1

In this embodiment, one feedback loop and one target feedback antenna with a fixed position are configured in the transmitter device. The phase of the phase shifter is adjusted, so that the transmitter device completes signal receiving and feedback, specifically, completes signal receiving and feedback in a primary beam direction. In other words, in this embodiment, the phase of the phase shifter is adjusted, so that the phase difference between the first mixed signal and the second mixed signal falls within a preset range.

Figure 4:
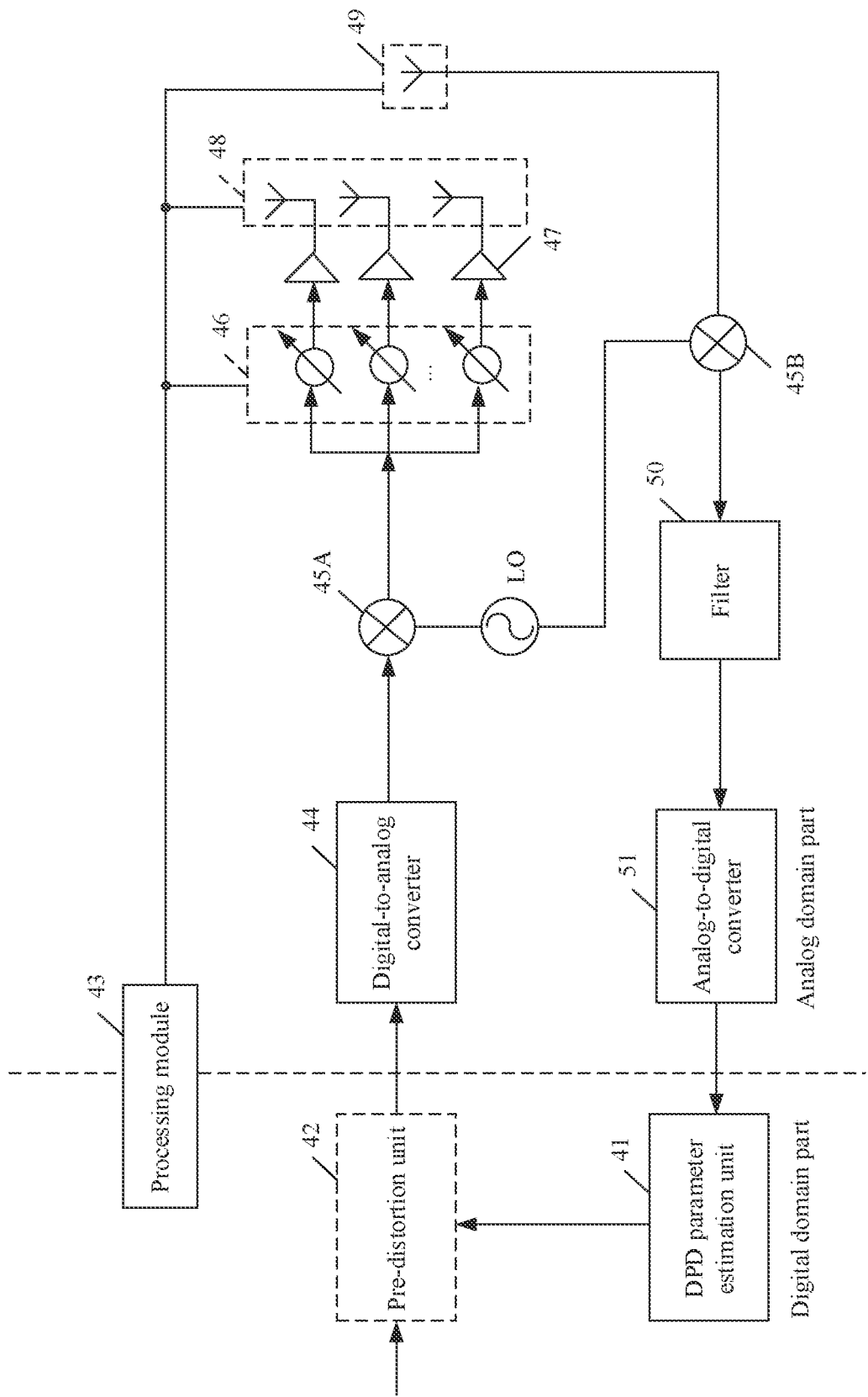
FIG. 4 is a schematic structural diagram of another transmitter device according to an embodiment of this application.

FIG. 4 is a schematic diagram of a transmitter device according to an embodiment of this application. The transmitter device shown in FIG. 4 includes a digital domain part and an analog domain part. Specifically:

The digital domain part includes:

A DPD parameter estimation unit 41 is configured to estimate a DPD parameter based on a preset distortion behavior model by using a training signal sent by a transmit antenna array 47 and a training signal received and fed back by a target feedback antenna 48 as a reference.

A pre-distortion unit 42 is configured to perform a pre-distortion operation on a to-be-sent signal by using the estimated DPD parameter.

The DPD parameter estimation unit 41 and the pre-distortion unit 42 may be implemented by using software or hardware, or may be implemented by using software in combination with hardware. This is not limited in this embodiment of this application. For example, the DPD parameter estimation unit 41 and the pre-distortion unit 42 may be implemented by using the processor 33.

In addition, in FIG. 4, in addition to being specifically embodied as the DPD parameter estimation unit 41 and the pre-distortion unit 42, the processor 33 may be further embodied as a processing module 43, configured to control the transmit antenna array 47 and the target feedback antenna 48. Optionally, the processing module 43 may be further configured to set a target phase of one or more (for example, each) phase shifters in a phase shifter group 46, so that a phase of the one or more (for example, each) phase shifters is output as the target phase. Target phases of different phase shifters may be the same or may be different. Optionally, the processing module 43 may be further configured to obtain related parameters, such as Θ, Ψ, and Γ in the following through antenna calibration. For specific examples, refer to the following descriptions.

It may be understood that some functions of the processing module 43, such as obtaining Θ, Ψ, and Γ, may belong to a digital domain function, and the other functions, such as setting the target phase of the phase shifter, may belong to an analog domain function.

The analog domain part includes:

A digital-to-analog converter (DAC) 44 is configured to convert a digital signal into an analog signal, for example, convert a binary number into a direct current voltage or a direct current.

A mixer 45 is configured to implement a linear shift operation of a signal spectrum. The mixer 45 includes an up-converter 45A and a down-converter 45B. The up-converter 45A is configured to perform an up-conversion operation on a baseband signal to obtain an intermediate frequency signal. The down-converter 45B is configured to perform a down-conversion operation on an intermediate frequency signal to obtain a baseband signal. In FIG. 4, both the up-converter 45A and the down-converter 45B use sine waves generated by one local oscillator (LO) as carriers. This is not limited in this embodiment of this application.

A phase shifter group 46 is configured to move a phase of an input signal on each branch circuit by one angle, and in a MIMO system, a beamforming operation for a sent signal may be implemented by using the phase shifter group. One transmit antenna group is connected to one phase shifter to form a transmit link.

A power amplifier is PA for short. The existence of the power amplifier causes nonlinear distortion of the sent signal.

A transmit antenna array 48 is configured to send a signal, such as the training signal described above or the to-be-sent signal on which pre-distortion processing has been performed. The transmit antenna array 48 includes the m transmit antenna groups 31 described above.

A target feedback antenna 49 is configured to receive a signal (for example, the first mixed signal described above) that is sent by the transmit antenna array 48 and that is fed back to the transmitter device through space transmission. The target feedback antenna 49 is the target feedback antenna 33.

A filter 50 is configured to: perform low-pass filtering on a received signal, namely, allow a signal with a frequency lower than a cut-off frequency to pass, and enable a signal with a frequency higher than the cut-off frequency to attenuate infinitely.

An analog-to-digital converter (ADC) 51 is configured to convert an analog signal into a digital signal, for example, convert a direct current voltage or a direct current into a binary number.

A connection relationship between the components/modules may be shown in FIG. 4, and details are not described herein again.

In this system, a feedback link includes the target feedback antenna 49, the down-converter 45B, the filter 50, and the analog-to-digital converter 51. The feedback loop feeds back a beamformed training signal to the DPD parameter estimation unit 41.

It should be noted that the transmit antenna array 48 and the target feedback antenna 49 in the analog domain part are physical antennas. Some or all of the other components may be logical modules, and may be specifically implemented by using software, may be implemented by using hardware, or may be implemented by using software in combination with hardware. If the components are implemented by using software, with reference to FIG. 3, the components may be specifically implemented by using the processor 33.

In addition, it should be noted that an architecture formed by the components/modules included in the transmitter device shown in FIG. 4 may be considered as a schematic diagram of a multi-channel DPD architecture included in the transmitter device. In a specific implementation process, the multi-channel DPD architecture includes more or fewer components/modules than those shown in FIG. 4, or the transmitter device may include more or fewer components/modules than those shown in FIG. 4. In addition, some components in FIG. 4 may alternatively be replaced with components having same functions. This is not specifically limited in this embodiment of this application.

Figure 5:
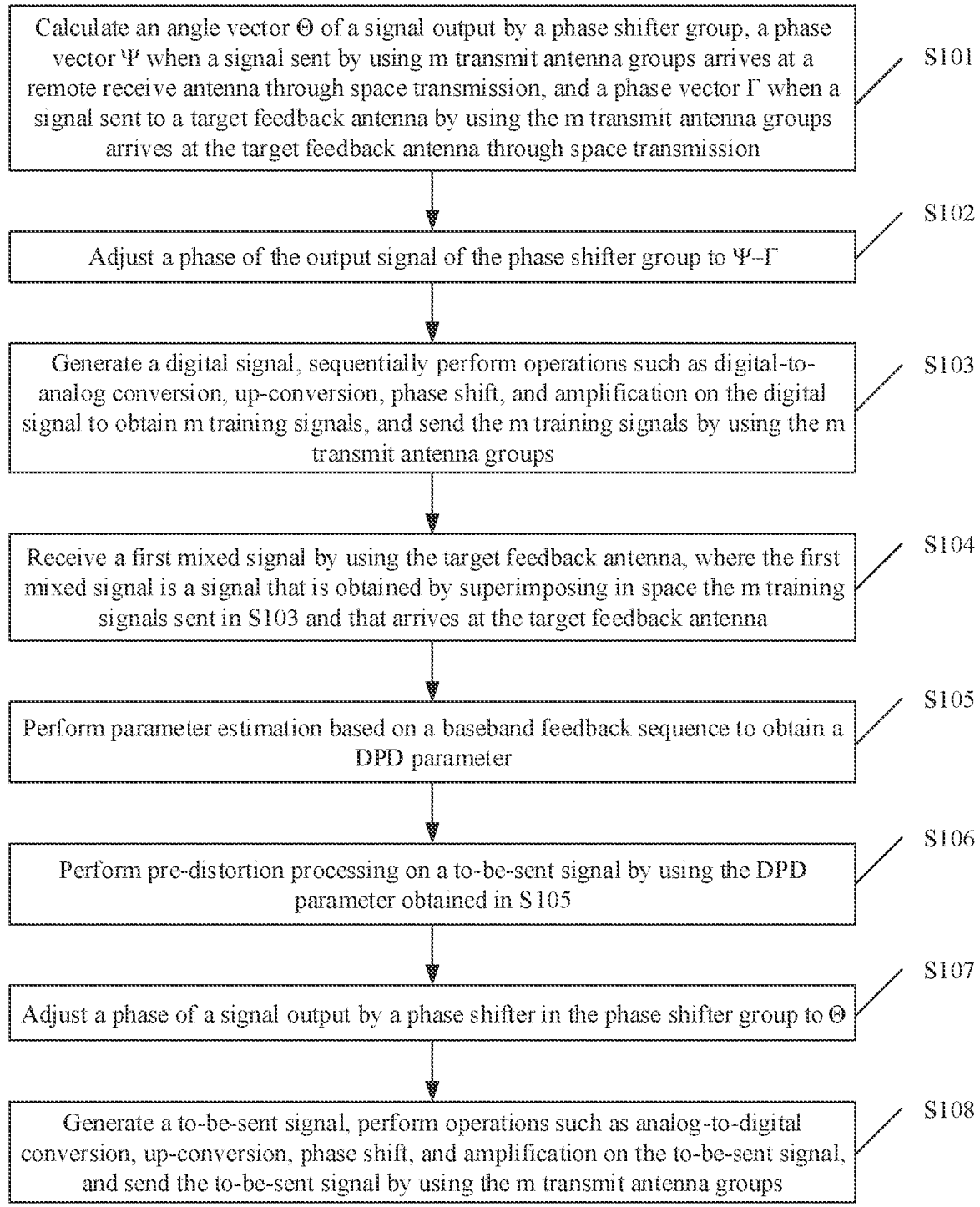
FIG. 5 is a schematic flowchart of a signal processing method provided based on FIG. 4 according to an embodiment of this application.

Based on FIG. 4, as shown in FIG. 5, the data processing method provided in the embodiments of this application includes the following steps.

S101: The transmitter device obtains a position of a remote receive antenna through antenna calibration; obtains distances and included angles between the remote receive antenna and m transmit antenna groups of the transmitter device based on the position of the remote receive antenna and positions of the m transmit antenna groups; and then calculates, based on the obtained distances and included angles between the remote receive antenna and the m transmit antenna groups, an angle vector Θ of a signal output by a phase shifter group, a phase vector T when a signal sent by using the m transmit antenna groups arrives at the remote receive antenna through space transmission, and a phase vector Γ when a signal sent to the target feedback antenna by using the m transmit antenna groups arrives at the target feedback antenna through space transmission.

The remote receive antenna is a receive antenna of the receiver device that is configured to receive "a signal sent by the m transmit antenna groups".

When the transmitter device is specifically a network device, and the receiver device is specifically a terminal, when the network device detects that distances and/or included angles between a receive antenna (namely, a remote receive antenna) of the terminal and m transmit antenna groups of the network device change because the terminal newly accesses the network device or a position of the terminal that has accessed the network device changes;

or when a change of the distance and/or included angle exceeds a preset value, S101 may be performed. Certainly, this is not limited thereto.

A specific implementation of antenna calibration has been described in detail in the related art, and details are not described herein again.

The following describes manners for obtaining Θ, Ψ, and Γ:

It is assumed that the transmit antenna array 47 includes m transmit antenna groups. After antenna calibration, a start included angle $\theta_0$ between the m transmit antenna groups and the remote receive antenna and a distance vector $L=[l_1, l_2, \ldots, l_m]$ formed by distances between all of the m transmit antenna groups and the remote receive antenna may be obtained. $\theta_0$ is an included angle between a first transmit antenna group and the remote receive antenna, and $l_k$ is a distance between a $k^{th}$ transmit antenna group and the remote receive antenna, where k=1, 2, . . . , m.

In addition, because the position of the target feedback antenna is fixed, a start included angle $\gamma_0$ between the m transmit antenna groups and the target feedback antenna and a distance vector $S=[s_1, s_2, \ldots, s_m]$ formed by distances between all of the m transmit antenna groups and the target feedback antenna may also be determined. $\gamma_0$ is an included angle between the first transmit antenna group and the target feedback antenna, and $s_k$ is a distance between the $k^{th}$ transmit antenna group and the target feedback antenna, where k=1, 2, . . . , m.

Based on this, it is assumed that a distance between two adjacent transmit antenna groups is d, and a wavelength of a signal is λ.

Figure 6:
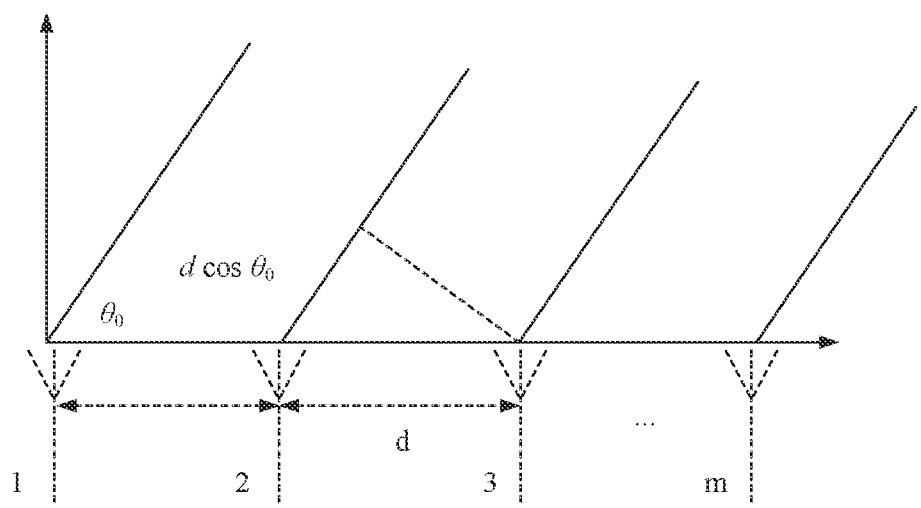
FIG. 6 is a schematic diagram of obtaining phases of signals output by phase shifters according to an embodiment of this application.

Referring to FIG. 6, it may be learned that, when the m transmit antenna groups transmit signals to the remote receive antenna, a phase vector formed by phases of signals output by phase shifters in the phase shifter group is:

$$\Theta = [\theta_1, \theta_2, \ldots, \theta_m], \text{ where } \theta_k = \theta_0 + \frac{2\pi}{\lambda}(k-1)d \cos\theta_0, k = 1, 2, \ldots m.$$

The phase vector when the signals sent by the m transmit antenna groups arrive at the remote receive antenna after space transmission is:

$$\Psi = [\varphi_1, \varphi_2, \ldots, \varphi_m], \text{ where } \varphi_k = \theta_k + \frac{2\pi}{\lambda}l_k, k = 1, 2, \ldots m.$$

Similarly, it can be learned that, when the m transmit antenna groups transmit signals to the target feedback antenna, a phase vector when the signals arrive at the target feedback antenna through space transmission is:

$$\Gamma = [\gamma_1, \gamma_2, \ldots, \gamma_m],$$
$$\text{where } \gamma_k = \gamma_0 + \frac{2\pi}{\lambda}(k-1)d \cos\gamma_0 + \frac{2\pi}{\lambda}s_k, k = 1, 2, \ldots m.$$

It should be noted that an example in which a quantity of remote receive antennas is 1 is used for description above. In a specific implementation process, if the quantity of remote receive antennas is greater than 1, distances and included angles between the m transmit antenna groups and each remote receive antenna may be calculated, and then Θ, Ψ, and Γ are determined based on the calculated distances and included angles. A person of ordinary skill in the art may reasonably deduce, based on the descriptions in this application and with reference to the technologies in the art, a method for determining Θ, Ψ, and Γ in this scenario without creative efforts. Therefore, details are not described in this embodiment of this application.

S102: The transmitter device adjusts a phase of the output signal of the phase shifter group to Ψ-Γ, so that a phase of a signal sent by one transmit antenna group when the signal arrives at the target feedback antenna is the same as a phase of the signal when the signal arrives at the remote receive antenna. In other words, primary beam directions of signals sent by the m transmit antenna groups are towards the target feedback antenna, or fitting of the signal received by the remote receive antenna is implemented at the target feedback antenna.

Specifically, k=1, 2, . . . , m is traversed, and the target phase of the phase shifter connected to the $k^{th}$ transmit antenna group is adjusted to $\xi_k = \varphi_k - \gamma_k$. In other words, a phase of a signal sent by the $k^{th}$ transmit antenna group is $\xi_k = \varphi_k - \gamma_k$.

It may be understood that, if the phase of the signal sent by the $k^{th}$ transmit antenna group is adjusted to:

$$\xi_k = \varphi_k - \gamma_k, k=1,2,\ldots,m$$

In this case, the phase of the signal sent by the $k^{th}$ transmit antenna group and received by the target feedback antenna is:

$$\hat{\gamma}_k = \xi_k + \gamma_k = \varphi_k, k=1,2\ldots,m$$

In other words, fitting of the signal received by the remote receive antenna may be implemented at the target feedback antenna.

In a specific implementation process, with reference to FIG. 3, S101 and S102 may be performed by the processor in the transmitter device. With reference to FIG. 4, S101 and S102 may be performed by the processing module 43 in the transmitter device.

It can be learned from the foregoing descriptions that, after S102 is performed, a phase of the first mixed signal received by the target feedback antenna and the second mixed signal received by the remote receive antenna may be equal. In other words, this example may be considered as an example in which the phase difference between the first mixed signal and the second mixed signal falls within the preset range.

S102 may be considered as an example in which the transmitter device obtains the phase of the output signal of the phase shifter group based on Ψ and Γ. In a specific implementation process, S102 may be replaced with: The transmitter device adjusts a phase of the output signal of the phase shifter group to Ψ-Γ+Δ, so that primary beam directions of signals sent by the m transmit antenna groups are towards the target feedback antenna as far as possible, or a difference between a phase of a signal sent by one transmit antenna group when the signal arrives at the target feedback antenna and a phase of the signal when the signal arrives at the remote receive antenna falls within the preset range, where $\Delta=[\Delta_1, \Delta_2, \ldots \Delta_m]$. In other words, the phase of the signal sent by the $k^{th}$ transmit antenna group is adjusted to $\xi_k = \varphi_k - \gamma_k + \Delta_k$. Certainly, this embodiment of this application is not limited thereto.

S102 may be considered as adjusting a phase of a phase shifter in a phase shifter group for the first time, to adjust a phase of a sent training signal.

S103: The transmitter device generates a digital signal, sequentially performs operations such as digital-to-analog conversion, up-conversion, phase shift, and amplification on the digital signal to obtain m training signals, and sends the m training signals by using m transmit antenna groups. For example, an $m^{th}$ transmit antenna group sends an $m^{th}$ training signal.

With reference to FIG. 4, S103 may include: The processing module generates a digital signal, and outputs the digital signal to the digital-to-analog converter. The digital signal is usually a binary sequence on which pre-distortion processing has not been performed. The digital-to-analog converter performs digital-to-analog conversion on the received digital signal to obtain an analog signal, and sends the analog signal to the up-converter. The up-converter performs an up-conversion operation on the received analog signal, and sends the signal on which the up-conversion operation has been performed to the phase shifter group. The $k^{th}$ phase shifter in the phase shifter group adjusts a phase of a received signal to $\xi_k$, and sends the signal whose phase is $\xi_k$ to a power amplifier connected to the $k^{th}$ phase shifter, where k=1, 2, . . . , m. The power amplifier connected to the $k^{th}$ phase shifter performs amplification on power of the received signal, to obtain a $k^{th}$ training signal of the m training signals.

It should be noted that a specific implementation process of S103 and S103 is merely a training signal obtaining example applicable to this embodiment of this application, and does not constitute a limitation on a training signal obtaining method applicable to this embodiment of this application. For example, a process for generating the training signal by the transmitter device may include more or fewer operations than those shown in S103.

It may be understood that S102 only needs to be performed before the phase shift operation in S103 is performed. For example, S102 may be performed before, after, or during one or more steps of generation, digital-to-analog conversion, and up-conversion in S103.

S104: The transmitter device receives a first mixed signal by using the target feedback antenna, where the first mixed signal is a signal that is obtained by superimposing in space the m training signals sent in S103 and that arrives at the target feedback antenna; and then, performs operations such as down-conversion, filtering, and analog-to-digital conversion on the first mixed signal to obtain a baseband feedback sequence.

With reference to FIG. 4, S104 may include: The target feedback antenna sends the first mixed signal to the down-converter; the down-converter performs a down-conversion operation on the received first mixed signal, and sends the signal on which the down-conversion operation has been performed to the filter. The filter performs low-pass filtering on the received signal on which the down-conversion operation has been performed, and sends the signal to the analog-to-digital converter. The analog-to-digital converter performs analog-to-digital conversion on the received filtered analog signal to obtain the baseband feedback sequence. The baseband feedback sequence is a digital signal.

S105: The transmitter device performs parameter estimation based on the baseband feedback sequence to obtain a DPD parameter. Specifically, the processor in the transmitter device may perform S105. With reference to FIG. 4, the DPD parameter estimation unit may perform S105.

By this point, the process of obtaining the DPD parameter ends.

For example, the transmitter device performs parameter estimation based on the baseband feedback sequence by using a closed-loop parameter estimation solution (which may also be referred to as a direct learning manner) or an open-loop parameter estimation solution (which may also be referred to as an indirect learning manner), to obtain the DPD parameter. For a specific implementation process, refer to the related art. Details are not described herein again.

S106: The transmitter device performs pre-distortion processing on the to-be-sent signal by using the DPD parameter obtained in S105. Specifically, the processor in the transmitter device may perform S106. With reference to FIG. 4, the pre-distortion unit may perform S105.

S107: The transmitter device adjusts a phase of a signal output by a phase shifter in the phase shifter group to Θ, so that the sent signal is towards the remote receive antenna, for example, a primary beam direction of the sent signal is towards the remote receive antenna. Specifically, the phase of the signal output by the $k^{th}$ phase shifter is adjusted to $\theta_k$.

S107 may be considered as adjusting a phase of a phase shifter in the phase shifter group for the second time, to adjust a phase of a sent to-be-sent signal.

S108: The transmitter device generates a to-be-sent signal, performs operations such as analog-to-digital conversion, up-conversion, phase shift, and amplification on the to-be-sent signal, and sends the to-be-sent signal by using the m transmit antenna groups.

Specifically, the processor in the transmitter device generates the to-be-sent signal, and then sends the to-be-sent signal to the analog-to-digital converter to perform operations such as digital-to-analog conversion. For a subsequent process, refer to the foregoing descriptions of specific implementation of S103.

It may be understood that in a specific implementation process, an execution sequence of S106 and S107 is not limited. In addition, only S107 needs to be performed before the phase shift operation in S108 is performed. Specific examples are not listed one by one.

Embodiment 2

In this embodiment, one feedback link and one target feedback antenna with a variable position are configured in the transmitter device. A position of the target feedback antenna is adjusted, so that the transmitter device can complete signal receiving and feedback, specifically, signal receiving and feedback in a primary beam direction. In other words, in this embodiment, the position of the target feedback antenna is adjusted, so that the phase difference between the first mixed signal and the second mixed signal falls within the preset range.

Figure 7:
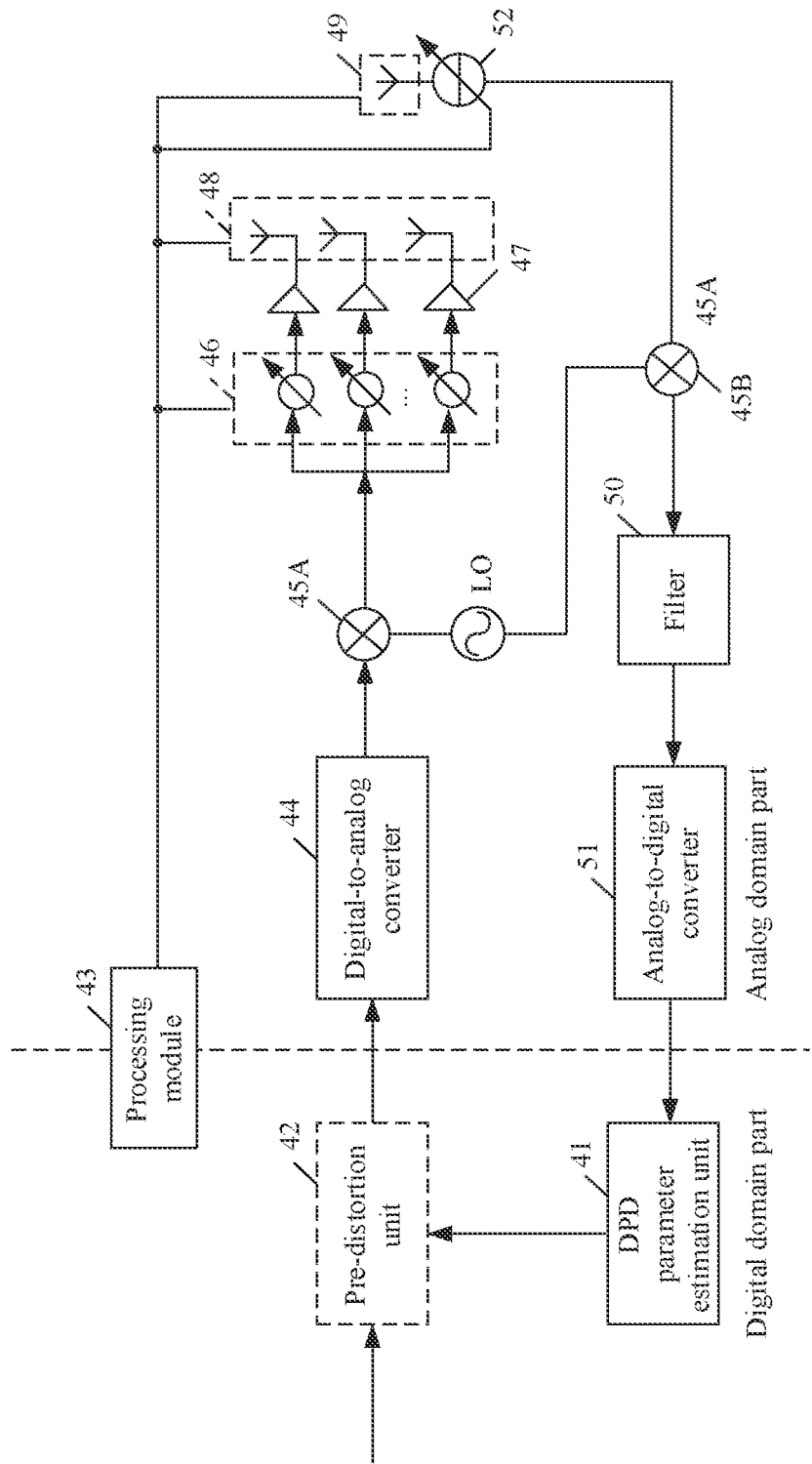
FIG. 7 is a schematic structural diagram of another transmitter device according to an embodiment of this application.

FIG. 7 is a schematic diagram of a transmitter device according to an embodiment of this application. Compared with FIG. 4, the position of the target feedback antenna in the transmitter device shown in FIG. 7 is variable. Optionally, to implement position-variable of the target feedback antenna, an antenna support 52 may be configured in FIG. 7, to support the target feedback antenna. The processing module 43 may adjust the position of the target feedback antenna by controlling a position of the antenna support 52.

For explanations of other components in FIG. 7, refer to FIG. 4. Details are not described herein again. In addition, in this embodiment, for explanations of related terms such as Θ, refer to Embodiment 1.

Figure 8:
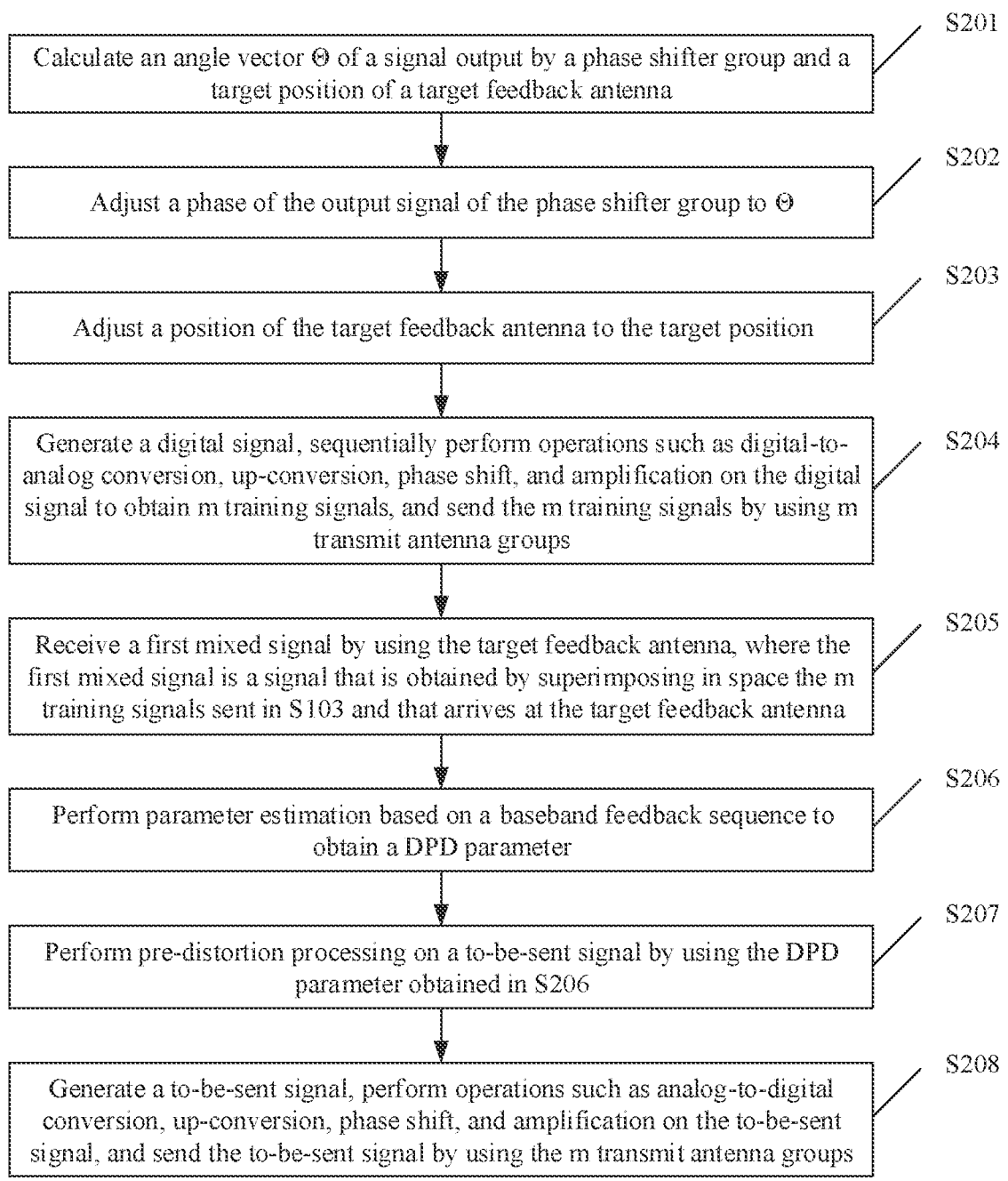
FIG. 8 is a schematic flowchart of a signal processing method provided based on FIG. 7 according to an embodiment of this application.

Based on FIG. 7, FIG. 8 is a flowchart of a data processing method according to an embodiment of this application. The method includes the following steps.

S201: The transmitter device calculates an angle vector Θ of a signal output by the phase shifter group and a target position of the target feedback antenna.

For a specific example of calculating the angle vector Θ of the signal output by the phase shifter group, refer to Embodiment 1.

The position of the remote receive antenna is obtained through antenna calibration. Distances and included angles between the remote receive antenna and the m transmit antenna groups respectively are obtained based on the position of the remote receive antenna and positions of the m transmit antenna groups. Then, the angle vector Θ of the signal output by the phase shifter group is calculated based on the obtained distances and included angles between the remote receive antenna and the m transmit antenna groups respectively. In addition, the transmitter device further needs to calculate a movement position of the target feedback antenna.

In a specific implementation process, for a trigger condition for performing S201 by the transmitter device, refer to S101.

A specific implementation of calculating the movement position of the target feedback antenna is described below. The movement position of the target feedback antenna may be a position whose coordinates are (x, y, z), or may be a position whose distance from the position whose coordinates are (x, y, z) is less than or equal to a threshold.

Optionally, $x=r \cos \beta_0 \cos \alpha_0$, $y=r \cos \beta_0 \sin \alpha_0$, and $z=r \sin \beta_0$. (x, y, z) are coordinates in a coordinate system formed by an X-axis, a Y-axis, and a Z-axis, the X-axis, the Y-axis, and the Z-axis are mutually perpendicular to each other, and an origin of the coordinate system is a target transmit antenna group in the m transmit antenna groups. The target transmit antenna group is any one of the m transmit antenna groups, and a plane X-Y formed by the X-axis and the Y-axis is a plane on which the m transmit antenna groups are located. r is a distance between the target feedback antenna and the origin; $\beta_0$ is an included angle between a target connection line and the plane X-Y, where the target connection line is a connection line between the target feedback antenna and the origin; and $\alpha_0$ is an included angle between a projection of the target connection line on the plane X-Y and the X-axis.

The optional implementation is described below with reference to FIG. 9.

Figure 9:
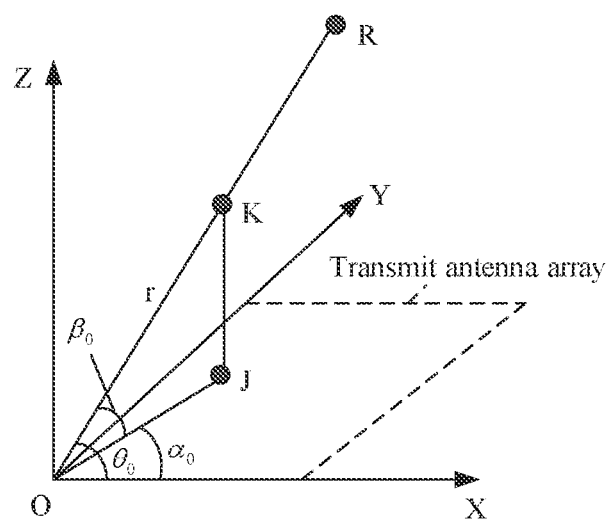
FIG. 9 is a schematic diagram of obtaining positions between a target feedback antenna, a transmit antenna array, and a remote receive antenna according to an embodiment of this application.

In FIG. 9, the X-Y plane on which the X-axis and the Y-axis are located is a plane on which a transmit antenna array is located, and an origin O is a position of any transmit antenna group (for example, a first transmit antenna group) in the transmit antenna array. The coordinate axis that passes through the origin O and that is perpendicular to the X-Y plane is the Z axis. A point R is a position of the receiver device, and a point K is a position of the target feedback antenna. A point J is a projection of the target feedback antenna on the X-Y plane. It may be understood that, to implement fitting, at the target feedback antenna, of a signal received by the remote receive antenna, the point K is on a straight line OR on which the point O and the point R are located.

Based on this, it can be learned that, a projection of a connection line OK from the origin O to the target feedback antenna on the X-Y plane is a line segment OJ. It is assumed that an included angle between the line segment OJ and the X-axis is $\alpha_0$, an included angle between the line segment OK and the X-Y plane is $\beta_0$, and an included angle between the line segment OK and the X-axis is $\theta_0$. In an antenna calibration phase, the transmitter device exchanges information with the receiver device to obtain values of $\beta_0$ and $\theta_0$. For a specific implementation, refer to the related art.

Therefore, a value of $\alpha_0$ may be obtained by using the formula $\cos \theta_0 = \cos \alpha_0 \cdot \cos \beta_0$.

Assuming that a length of OK is r, it may be learned that the target feedback antenna should move to a position at a distance (x, y, z) from the origin O, where $$x = r \cos \beta_0 \cos \alpha_0$$

$$y = r \cos \beta_0 \sin \alpha_0$$

$$z = r \sin \beta_0.$$

It may be understood that, generally, the remote receive antenna performs omnidirectional reception. Therefore, an orientation of the target feedback antenna is not limited in this embodiment of this application. If the transmit antenna group used as the origin remains unchanged, and the transmit antenna group participates in sending all signals, r may be fixed. When the transmit beam direction is switched, only the included angle needs to be updated and the antenna needs to be moved. Certainly, r may also be variable. In this way, when the beam direction is switched, a new transmit antenna group used as the origin is enabled. In this case, the included angle and the r value may be updated through table lookup or calculation.

S202: The transmitter device adjusts a phase of the output signal of the phase shifter group to Θ.

S203: The transmitter device adjusts the position of the target feedback antenna to the target position, so that primary beam directions of signals sent by the m transmit antenna groups are towards the target feedback antenna.

It can be learned from the foregoing descriptions that, after S103 is performed, a phase of the first mixed signal received by the target feedback antenna and the second mixed signal received by the remote receive antenna may be equal. In other words, this example may be considered as an example in which the phase difference between the first mixed signal and the second mixed signal falls within the preset range.

An execution sequence of S202 and S203 is not limited in this embodiment of this application.

In a specific implementation process, with reference to FIG. 3, S201 and S202 may be performed by the processor 33 in the transmitter device. With reference to FIG. 7, S201 and S202 may be performed by the processing module 43 in the transmitter device.

S204 to S207: Refer to S103 to S106.

S208: Refer to S108.

Embodiment 3

In this embodiment, one feedback link and a candidate feedback antenna group are configured in the transmitter device. The candidate feedback antenna group includes at least two candidate feedback antennas, and each candidate feedback antenna in the candidate feedback antenna group has a different position. One candidate feedback antenna is selected from the candidate feedback antenna group as the target feedback antenna, so that the transmitter device can complete signal receiving and feedback, and specifically complete signal receiving and feedback in a primary beam direction. In other words, in this embodiment, the phase of the phase shifter is adjusted, so that the phase difference between the first mixed signal and the second mixed signal falls within the preset range.

Figure 10:
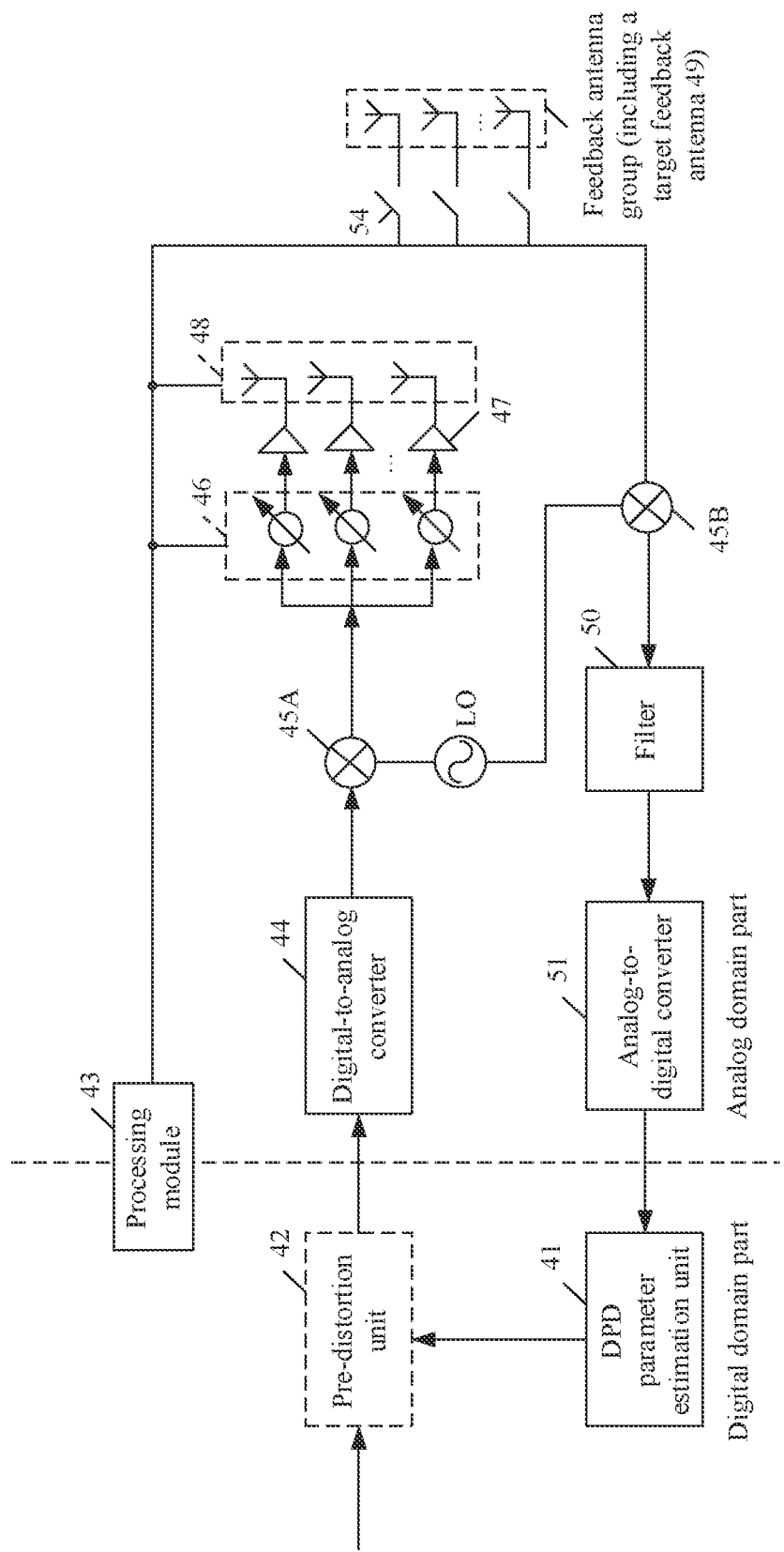
FIG. 10 is a schematic structural diagram of another transmitter device according to an embodiment of this application.

FIG. 10 is a schematic diagram of a transmitter device according to an embodiment of this application. Compared with FIG. 4, at least two candidate feedback antennas are configured in the transmitter device shown in FIG. 10.

Optionally, each candidate feedback antenna is connected to a processor (which may be specifically the processing module 43) by using a switch 54. The processor (which may be specifically the processing module 43) is further configured to select the target feedback antenna from the at least two candidate feedback antennas and control the switch 54, to connect the processor (which may be specifically the processing module 43) to the target feedback antenna 49.

For explanations of other components in FIG. 10, refer to FIG. 4. Details are not described herein again. In addition, in this embodiment, for explanations of related terms such as Θ, refer to Embodiment 1.

Figure 11:
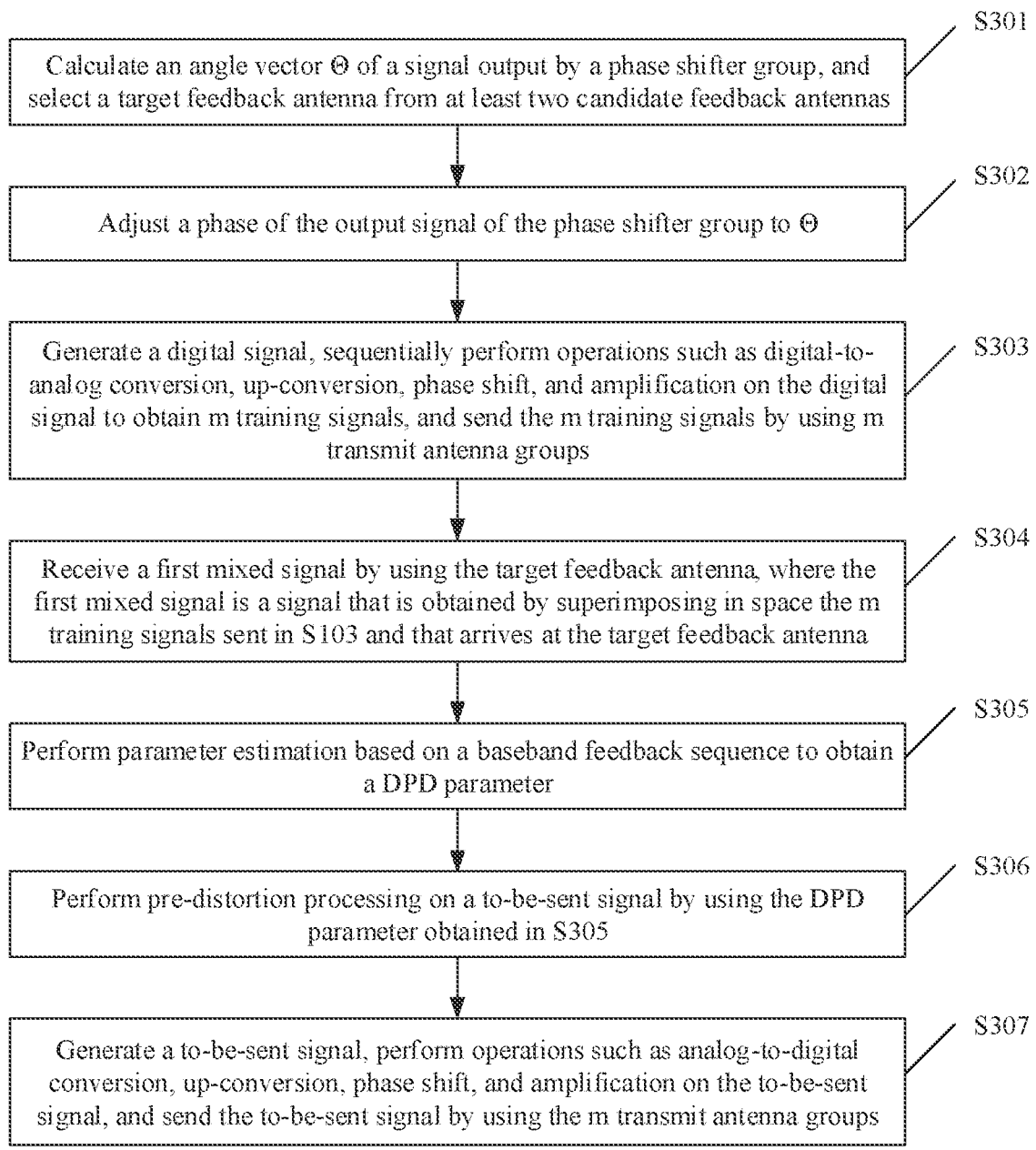
FIG. 11 is a schematic flowchart of a signal processing method provided based on FIG. 10 according to an embodiment of this application.

Based on FIG. 10, FIG. 11 is a flowchart of a data processing method according to an embodiment of this application. The method includes the following steps.

S301: The transmitter device calculates an angle vector Θ of a signal output by a phase shifter group, and selects the target feedback antenna from the at least two candidate feedback antennas.

In a specific implementation process, for a trigger condition for performing S301 by the transmitter device, refer to S101. For a specific example of calculating the angle vector Θ of the signal output by the phase shifter group, refer to Embodiment 1.

A specific implementation of selecting the target feedback antenna from the at least two candidate feedback antennas is described below.

Optionally, a candidate feedback antenna that is in the candidate feedback antenna group and that is closest to coordinates (x, y, L) is used as the target feedback antenna, where $$x = \frac{L}{\tan \beta_0} \cos \alpha_0 \text{ and } y = \frac{L}{\tan \beta_0} \sin \alpha_0.$$

The coordinates (x, y, L) are coordinates in a coordinate system formed by an X-axis, a Y-axis, and a Z-axis, the X-axis, the Y-axis, and the Z-axis are mutually perpendicular to each other, and an origin of the coordinate system is a target transmit antenna group in the m transmit antenna groups. The target transmit antenna group is any one of the m transmit antenna groups, a plane X-Y formed by the X-axis and the Y-axis is a plane on which the m transmit antenna groups are located, and a plane on which the candidate feedback antenna group is located is parallel to the plane on which the m transmit antenna groups are located. L is a distance between the plane on which the candidate feedback antenna group is located and the plane on which the m transmit antenna groups are located; $\beta_0$ is an included angle between a target connection line and the plane X-Y, where the target connection line is a connection line between the target feedback antenna and the origin; and $\alpha_0$ is an included angle between a projection of the target connection line on the plane X-Y and the X-axis.

The optional implementation is described below with reference to FIG. 12.

Figure 12:
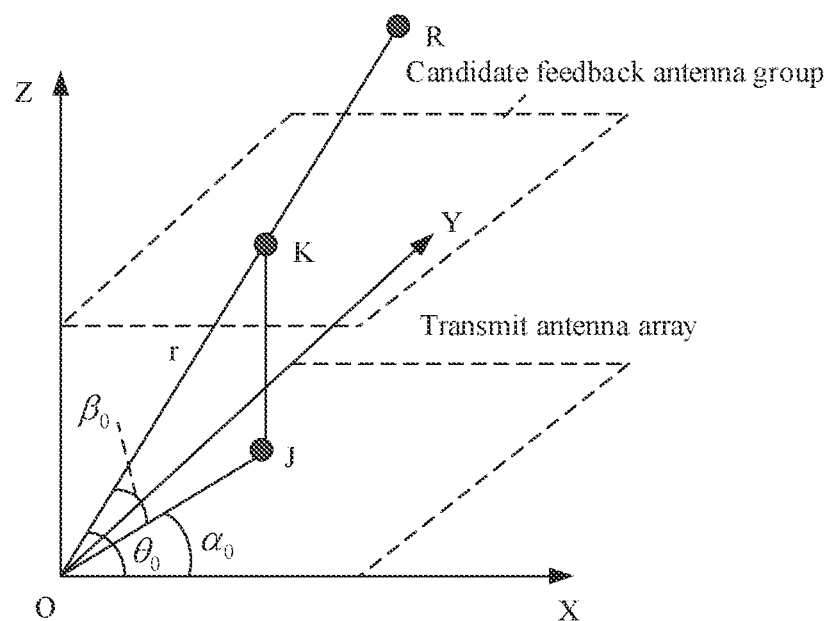
FIG. 12 is another schematic diagram of obtaining positions between a target feedback antenna, a transmit antenna array, and a remote receive antenna according to an embodiment of this application.

A difference between FIG. 12 and FIG. 9 lies in that, in FIG. 9, only one feedback antenna is configured in the transmitter device, and in FIG. 12, a candidate feedback antenna group is configured in the transmitter device. For explanations of related parameters in FIG. 12, refer to the foregoing descriptions of FIG. 9. It can be learned from the foregoing descriptions of FIG. 9 that, a value of $\alpha_0$ may be obtained according to the formula $\cos \theta_0 = \cos \alpha_0 \cdot \cos \beta_0$.

A feedback antenna whose position of the target feedback antenna in the feedback antenna array is (x, y, L) may be obtained based on a vertical distance between a plane on which the transmit antenna array is located and the plane on which the candidate feedback antenna group is located, where $$x = \frac{L}{\tan \beta_0} \cos \alpha_0 \text{ and } y = \frac{L}{\tan \beta_0} \sin \alpha_0.$$

It may be understood that, in a specific implementation process, because a position of a candidate feedback antenna in the candidate feedback antenna group is fixed, there may be no feedback antenna whose position is exactly (x, y, L). In this case, a candidate feedback antenna that is in the candidate feedback antenna group and that is closest to (x, y, L) may be used as the target feedback antenna.

S302: The transmitter device adjusts a phase of the output signal of the phase shifter group to Θ.

S303 to S307: Refer to S204 to S208.

It should be noted that Embodiments 1 to 3 are described by using one target feedback antenna as an example. In an actual implementation process, this is not limited in this embodiment of this application. In other words, by using at least two feedback antennas configured in the transmitter device, the transmitter device may be enabled to complete signal receiving and feedback, or the phase difference between the first mixed signal and the second mixed signal falls within the preset range. Optionally, the transmitter device may determine a DPD parameter based on signals that may be simultaneously received or successively received by the at least two feedback antennas.

In the transmitter device provided in this embodiment of this application, the target feedback antenna is locally configured to simulate a phase of a signal received by the receiver device, to determine the DPD parameter based on the simulated phase. The components/modules in the transmitter device provided in this embodiment of this application and a connection relationship between the components/modules may be considered as a multi-channel DPD architecture provided in this embodiment of this application. For comparison, a currently common multi-channel DPD architecture is described herein. In the common multi-channel DPD architecture, a plurality of phase shifters are configured in a feedback loop to adjust a phase of a sent training signal, then an adder (or accumulator) is configured to fit a signal obtained after adjustment by the plurality of phase shifters, and next, the fitted signal is sent to the filter. It can be learned that, on one hand, in the technical solutions provided in this embodiment of this application, a signal is locally received and fed back by the transmitter device by using the target feedback antenna (for example, the objective is implemented by using any one of Embodiment 1 to Embodiment 3), and therefore, a phase shifter does not need to be configured in a feedback loop of the transmitter device. On the other hand, because a signal received by the target feedback antenna is a signal obtained after beamforming and spatial superposition have been performed, a hardware module, such as an adder, configured to fit feedback signals of a plurality of training signals does not need to be configured in the transmitter device. Therefore, the transmitter device provided in this embodiment of this application does not need to have a complex structure and can simulate the phase of the signal received by the receiver device, and implementation is simple. In addition, a feedback delay can be reduced without the phase shifter and the adder in the feedback loop. In addition, disposing the feedback antenna can avoid interference caused by a near-field effect of the transmit antenna array. It can be learned from the foregoing that the technical solutions provided in the embodiments of this application can improve overall system performance.

An embodiment of this application further provides a signal processing apparatus, configured to perform any one of the foregoing signal processing methods.

Optionally, the apparatus is divided into functional modules based on any one of the foregoing signal processing methods. For example, each functional module may be obtained through division corresponding to each function, or two or more functions may be integrated into one processing module. In this case, the apparatus may be a transmitter device (for example, a network device or a terminal).

Optionally, the apparatus may include a memory and a processor. The memory is configured to store a computer program; and the processor is configured to invoke the computer program, to perform any one of the foregoing signal processing methods. In this case, the apparatus may be a transmitter device (for example, a network device or a terminal) or a chip.

An embodiment of this application further provides a communications system. The communications system includes a transmitter device and a receiver device. The transmitter device may be any transmitter device provided above. For a function of the transmitter device, refer to the foregoing descriptions. The receiver device is configured to cooperate with the transmitter device to complete the signal processing method provided above.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a procedure of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another single unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to the specific features and the embodiments without departing from the scope of this application. Correspondingly, the specification and the accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the spirit and scope of this application. In this way, if these modifications and variations to this application fall within the scope of the claims of this application and their equivalent technologies, this application is also intended to cover these modifications and variations.

What is claimed is:

1. A transmitter device, comprising m transmit antenna groups, a target feedback antenna, and a processor, wherein each of the m transmit antenna groups comprises at least one transmit antenna, m is an integer greater than or equal to 1, and the m transmit antenna groups and the target feedback antenna are separately connected to the processor, wherein
the m transmit antenna groups are configured to send m training signals under control of the processor, and each transmit antenna group is configured to send one training signal;
the target feedback antenna is configured to receive, under control of the processor, a first mixed signal that is a superimposition of the m training signals in space, wherein a phase difference between the first mixed signal and a second mixed signal falls within a preset range, and the second mixed signal is a superimposition, in space, of the m training signals received by a receiver device;
the processor is configured to: perform digital pre-distortion (DPD) parameter estimation based on the first mixed signal to obtain a DPD parameter, and perform pre-distortion processing on a to-be-sent signal based on the DPD parameter; and
the m transmit antenna groups are further configured to send, under control of the processor, the to-be-sent signal on which the pre-distortion processing based on the DPD parameter has been performed.

2. The transmitter device according to claim 1, wherein the transmitter device further comprises m phase shifters connected to the processor, and each phase shifter is connected to one transmit antenna group; and
the processor is further configured to set a phase of a $k^{th}$ phase shifter of the m phase shifters to a target phase $\xi_k$, wherein $1 \leq k \leq m$, k is an integer, and a $k^{th}$ transmit antenna group of the m transmit antenna groups is connected to the $k^{th}$ phase shifter, wherein
the $k^{th}$ phase shifter is configured to adjust a phase of a received signal to the target phase $\xi_k$ and use the phase-adjusted received signal as a $k^{th}$ training signal of the m training signals, so that a phase difference between the first mixed signal and the second mixed signal falls within the preset range.

3. The transmitter device according to claim 2, wherein the processor is further configured to obtain the target phase $\xi_k$ based on $\phi_k$ and $\gamma_k$, wherein $\phi_k$ is a phase of the $k^{th}$ training signal when the $k^{th}$ training signal arrives at the receiver device through space transmission, and $\gamma_k$ is a difference between a phase of the $k^{th}$ training signal to be sent and a phase when the $k^{th}$ training signal arrives at the target feedback antenna through space transmission.

4. The transmitter device according to claim 3, wherein the processor is configured to obtain the target phase $\xi_k$ according to a formula $\xi_k = \phi_k - \gamma_k$.

5. The transmitter device according to claim 1, wherein the processor is further configured to adjust a position of the target feedback antenna, such that the phase difference between the first mixed signal and the second mixed signal falls within the preset range.

6. The transmitter device according to claim 5, wherein the processor is configured to adjust the position of the target feedback antenna to a position having coordinates (x, y, z), wherein $x = r \cos \beta_0 \cos \alpha_0$, $y = r \cos \beta_0 \sin \alpha_0$, and $z = r \sin \beta_0$;

(x, y, z) are coordinates in a coordinate system formed by an X-axis, a Y-axis, and a Z-axis, the X-axis, the Y-axis, and the Z-axis are mutually perpendicular to each other, an origin of the coordinate system is a target transmit antenna group in the m transmit antenna groups, the target transmit antenna group is any one of the m transmit antenna groups, and a plane X-Y formed by the X-axis and the Y-axis is a plane on which the m transmit antenna groups are located;

r is a distance between the target feedback antenna and the origin; and $\beta_0$ is an included angle between a target connection line and the plane X-Y, wherein the target connection line is a connection line between the target feedback antenna and the origin, and $\alpha_0$ is an included angle between a projection of the target connection line on the plane X-Y and the X-axis.

7. The transmitter device according to claim 1, wherein the target feedback antenna is one feedback antenna of at least two candidate feedback antennas included in the transmitter device, different feedback antennas of the at least two candidate feedback antennas have different positions, and each of the at least two candidate feedback antennas is connected to the processor via a switch; and the processor is further configured to select the target feedback antenna from the at least two candidate feedback antennas, and control the switch corresponding to the target feedback antenna to connect the processor to the target feedback antenna, so that the phase difference between the first mixed signal and the second mixed signal falls within the preset range.

8. The transmitter device according to claim 7, wherein the processor is configured to use a candidate feedback antenna that is in the at least two candidate feedback antennas and that is closest to coordinates (x, y, L) as the target feedback antenna, wherein $$x = \frac{L}{\tan \beta_0} \cos \alpha_0 \text{ and } y = \frac{L}{\tan \beta_0} \sin \alpha_0,$$

wherein (x, y, L) are coordinates in a coordinate system formed by an X-axis, a Y-axis, and a Z-axis, the X-axis, the Y-axis, and the Z-axis are mutually perpendicular to each other, an origin of the coordinate system is a target transmit antenna group in the m transmit antenna groups, the target transmit antenna group is any one of the m transmit antenna groups, and a plane X-Y formed by the X-axis and the Y-axis is a first plane on which the m transmit antenna groups are located;

a second plane on which the at least two candidate feedback antennas are located is parallel to the first plane on which the m transmit antenna groups are located, and L is a distance between the second plane on which the at least two candidate feedback antennas are located and the first plane on which the m transmit antenna groups are located; and $\beta_0$ is an included angle between a target connection line and the plane X-Y, wherein the target connection line is a connection line between the target feedback antenna and the origin, and $\alpha_0$ is an included angle between a projection of the target connection line on the plane X-Y and the X-axis.

9. A signal processing method, applied to a transmitter device, wherein the method comprises:

sending m training signals, wherein m is an integer greater than or equal to 1;

receiving a first mixed signal that is a superimposition of the m training signals in space, wherein a phase difference between the first mixed signal and a second mixed signal falls within a preset range, and the second mixed signal is a superimposition, in space, of the m training signals received by a receiver device;

performing digital pre-distortion (DPD) parameter estimation based on the first mixed signal to obtain a DPD parameter, and performing pre-distortion processing on a to-be-sent signal based on the DPD parameter; and sending the to-be-sent signal on which the pre-distortion processing based on the DPD parameter has been performed.

10. The method according to claim 9, wherein the method further comprises:

adjusting a phase of a $k^{th}$ training signal of the m training signals to a target phase $\xi_k$, such that the phase difference between the first mixed signal and the second mixed signal falls within the preset range, wherein $1 \leq k \leq m$, and k is an integer.

11. The method according to claim 10, wherein the method further comprises:

obtaining the target phase $\xi_k$ based on $\phi_k$ and $\gamma_k$, wherein $\phi_k$ is a phase of the $k^{th}$ training signal when the $k^{th}$ training signal arrives at the receiver device through space transmission, and $\gamma_k$ is a difference between a phase of the $k^{th}$ training signal to be sent and a phase when the $k^{th}$ training signal arrives, through space transmission, at a target feedback antenna that is comprised in the transmitter device and that is configured to receive the first mixed signal.

12. The method according to claim 11, wherein obtaining the target phase $\xi_k$ based on $\phi_k$ and $\gamma_k$ comprises:

obtaining the target phase $\xi_k$ according to a formula $\xi_k = \phi_k - \gamma_k$.

13. The method according to claim 9, wherein the method further comprises:

adjusting a position of a target feedback antenna that is comprised in the transmitter device and that is configured to receive the first mixed signal, such that the phase difference between the first mixed signal and the second mixed signal falls within the preset range.

14. The method according to claim 13, wherein adjusting the position of the target feedback antenna comprises:

adjusting the position of the target feedback antenna to a position having coordinates (x, y, z), wherein $x = r \cos \beta_0 \cos \alpha_0$, $y = r \cos \beta_0 \sin \alpha_0$, and $z = r \sin \beta_0$;

(x, y, z) are coordinates in a coordinate system formed by an X-axis, a Y-axis, and a Z-axis, the X-axis, the Y-axis, and the Z-axis are mutually perpendicular to each other, an origin of the coordinate system is a target transmit antenna group in m transmit antenna groups, the target transmit antenna group is any one of the m transmit antenna groups, and a plane X-Y formed by the X-axis and the Y-axis is a plane on which the m transmit antenna groups are located;

r is a distance between the target feedback antenna and the origin; and $\beta_0$ is an included angle between a target connection line and the plane X-Y, wherein the target connection line is a connection line between the target feedback antenna and the origin, and $\alpha_0$ is an included angle between a projection of the target connection line on the plane X-Y and the X-axis.

15. The method according to claim 9, wherein the method further comprises:

selecting, from at least two candidate feedback antennas, a target feedback antenna that is comprised in the transmitter device and that is configured to receive the first mixed signal, such that the phase difference between the first mixed signal and the second mixed signal falls within the preset range, wherein different feedback antennas in the at least two candidate feedback antennas have different positions.

16. The method according to claim 15, wherein selecting, from the at least two candidate feedback antennas, the target feedback antenna comprises:

using a candidate feedback antenna that is in the at least two candidate feedback antennas and that is closest to coordinates (x, y, L) as the target feedback antenna, wherein $$x = \frac{L}{\tan \beta_0} \cos \alpha_0 \text{ and } y = \frac{L}{\tan \beta_0} \sin \alpha_0,$$

wherein (x, y, L) are coordinates in a coordinate system formed by an X-axis, a Y-axis, and a Z-axis, the X-axis, the Y-axis, and the Z-axis are mutually perpendicular to each other, an origin of the coordinate system is a target transmit antenna in m transmit antenna groups, the target transmit antenna is any transmit antenna in the m transmit antenna groups, and a plane X-Y formed by the X-axis and the Y-axis is a first plane on which the m transmit antenna groups are located;

a second plane on which the at least two candidate feedback antennas are located is parallel to the first plane on which the m transmit antenna groups are located, and L is a distance between the second plane on which the at least two candidate feedback antennas are located and the first plane on which the m transmit antenna groups are located; and $\beta_0$ is an included angle between a target connection line and the plane X-Y, wherein the target connection line is a connection line between the target feedback antenna and the origin, and $\alpha_0$ is an included angle between a projection of the target connection line on the plane X-Y and the X-axis.

17. A signal processing apparatus, comprising at least one non-transitory memory and at least one processor, wherein the at least one non-transitory memory is configured to store a computer program, and when running the computer program, the at least one processor is configured to:

send m training signals, wherein m is an integer greater than or equal to 1;

receive a first mixed signal that is a superimposition of the m training signals in space, wherein a phase difference between the first mixed signal and a second mixed signal falls within a preset range, and the second mixed signal is a superimposition, in space, of the m training signals received by a receiver device;

perform digital pre-distortion (DPD) parameter estimation based on the first mixed signal to obtain a DPD parameter, and perform pre-distortion processing on a to-be-sent signal based on the DPD parameter; and send the to-be-sent signal on which the pre-distortion processing based on the DPD parameter has been performed.

18. The apparatus according to claim 17, wherein the at least one processor is further configured to:

adjust a phase of a $k^{th}$ training signal of the m training signals to a target phase $\xi_k$, such that the phase difference between the first mixed signal and the second mixed signal falls within the preset range, wherein $1 \leq k \leq m$, and k is an integer.

19. The apparatus according to claim 18, wherein the at least one processor is further configured to:

obtain the target phase $\xi_k$ based on $\phi_k$ and $\gamma_k$, wherein $\phi_k$ is the phase of the $k^{th}$ training signal when the $k^{th}$ training signal arrives at the receiver device through space transmission, and $\gamma_k$ is a difference between a phase of the $k^{th}$ training signal to be sent and a phase when the $k^{th}$ training signal arrives, through space transmission, at a target feedback antenna that is comprised in a transmitter device and that is configured to receive the first mixed signal.

20. The apparatus according to claim 19, wherein when obtaining the target phase based on $\xi_k$ and $\gamma_k$, the at least one processor is configured to:

obtain the target phase $\xi_k$ according to a formula $\xi_k = \phi_k - \gamma_k$.

* * * * *